Figure 1A:
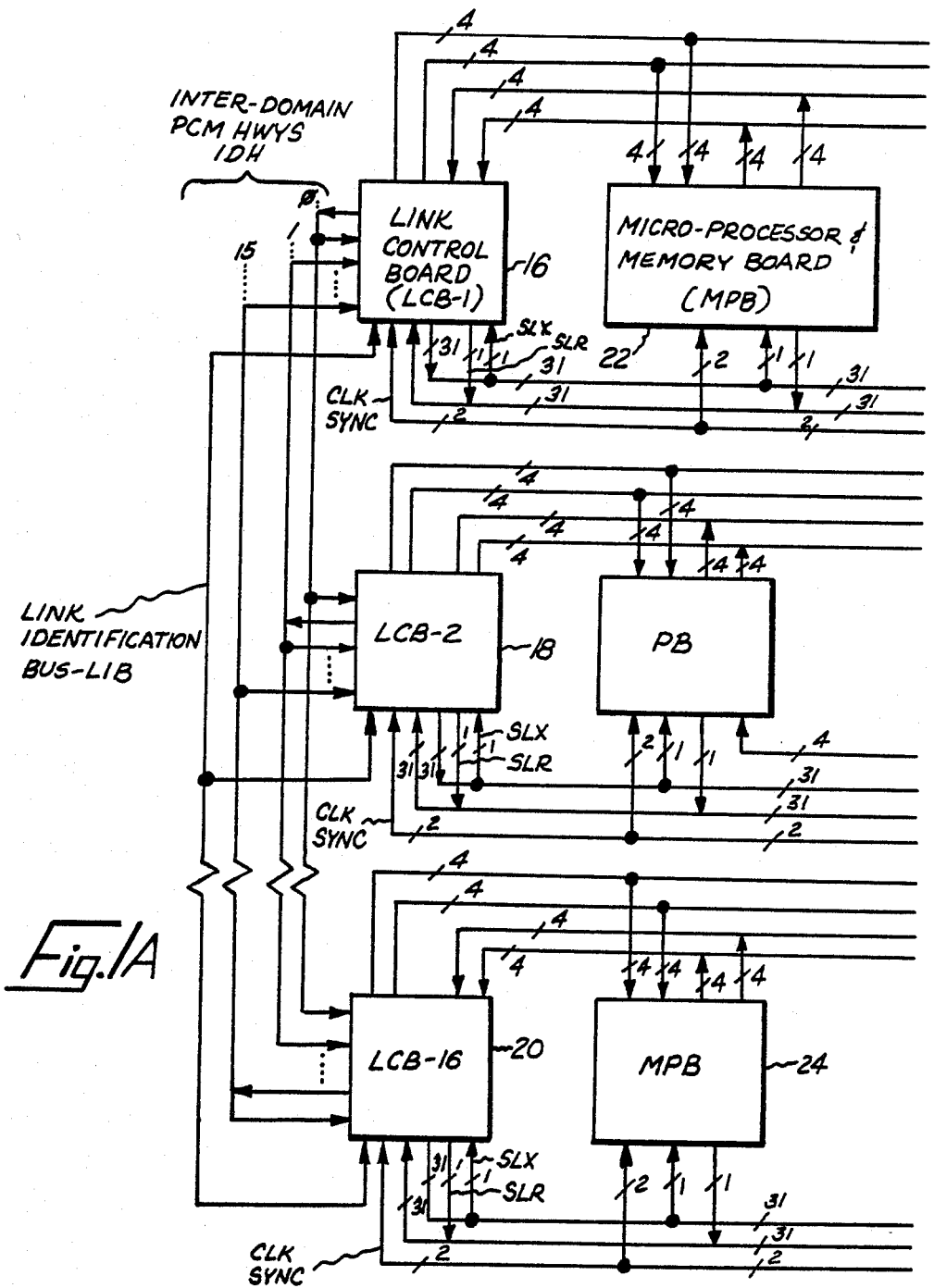

United States Patent [19]

Barbe et al.

[11] Patent Number: 4,805,172

[45] Date of Patent: Feb. 14, 1989

[54] TIME DIVISION MULTIPLEX (TDM) SWITCHING SYSTEM ESPECIALLY FOR PULSE CODE MODULATED (PCM) TELEPHONY SIGNALS

[75] Inventors: Charles A. Barbe, Rochester; Bruce G. Littlefield, Honeoye Falls, both of N.Y.

[73] Assignee: Redcom Laboratories, Inc., Victor, N.Y.

[21] Appl. No.: 36,934

[22] Filed: Apr. 10, 1987

[51] Int. Cl.[4] .............................................. H04J 3/12
[52] U.S. Cl. .................................. 370/68.1; 370/110.1
[58] Field of Search ................... 370/110.1, 68.1, 58, 370/68, 85; 379/54

[56] References Cited

U.S. PATENT DOCUMENTS

| | | | |
|---|---|---|---|
| 4,140,877 | 2/1979 | Joslow | 370/67 |
| 4,187,399 | 2/1980 | Maxfield et al. | 370/110.1 |
| 4,228,536 | 10/1980 | Guddenpfennig | 370/66 |
| 4,232,386 | 11/1980 | McDonald | 370/66 |
| 4,256,926 | 3/1981 | Pitroda | 379/269 |
| 4,272,844 | 6/1981 | Roche | 370/66 |
| 4,306,303 | 12/1981 | Hardy | 370/66 |
| 4,377,859 | 3/1983 | Dunning | 370/68 |
| 4,382,295 | 5/1983 | Moffitt | 370/68 |
| 4,421,955 | 12/1983 | Mori | 370/66 |
| 4,430,733 | 2/1984 | Hardy | 370/66 |
| 4,466,095 | 8/1984 | Kawano et al. | 370/110.1 |
| 4,473,900 | 9/1984 | Belforte | 370/58 |
| 4,485,467 | 11/1984 | Miles | 370/66 |
| 4,488,290 | 12/1984 | Dunn | 370/66 |
| 4,491,838 | 1/1985 | West | 340/825.05 |
| 4,510,597 | 4/1985 | Lewis | 370/66 |
| 4,516,272 | 5/1985 | Yano | 370/58 |
| 4,524,245 | 6/1985 | Littlefield | 379/373 |
| 4,543,653 | 9/1985 | Belforte | 370/66 |
| 4,545,049 | 10/1985 | Kammerer | 370/67 |
| 4,545,053 | 10/1985 | Raamst | 370/68 |
| 4,550,402 | 10/1985 | Gable | 370/85 |
| 4,564,936 | 1/1986 | Takahashi | 370/58 |
| 4,564,937 | 1/1986 | Perry | 370/58 |
| 4,569,043 | 2/1986 | Simmons | 370/63 |
| 4,581,732 | 4/1986 | Boisseau | 370/63 |
| 4,680,252 | 7/1987 | Takemura et al. | 370/68 |

Primary Examiner—Robert L. Griffin
Assistant Examiner—Frank M. Scutch, III
Attorney, Agent, or Firm—Martin LuKacher

[57] ABSTRACT

A TDM switching system for providing selected connections between large numbers of lines and trunks and which may combine, in an integrated system, several TDM switching systems which are adapted to handle smaller numbers of lines and trunks so as to expand the capacity of such smaller TDM systems. The system has a distributed, modular architecture in which the lines and trunks are arranged in a plurality of domains. The domains each have a link controller which links the domains to interdomain PCM highways. The domains each include, as the members thereof, a plurality of devices. These member devices can be port interfaces which connect telephone lines and trunks and convert the analog telephony signals into PCM signals and vice versa, circuits which provide services, telephony processors which contain the data base of the addresses (telephone numbers) of the various lines and trunks, ringing generators, and interface devices which provide a gateway for signals into the domains for the smaller TDM switching systems. Each domain has its own intradomain PCM highway to which the devices are connected and device control links connecting the devices to a link controller and carrying signalling messages. Each domain may have a different complement of devices. Control signals control the telephony signal process along separate links, unique to each device, which connect that device to the link controller.

22 Claims, 13 Drawing Sheets

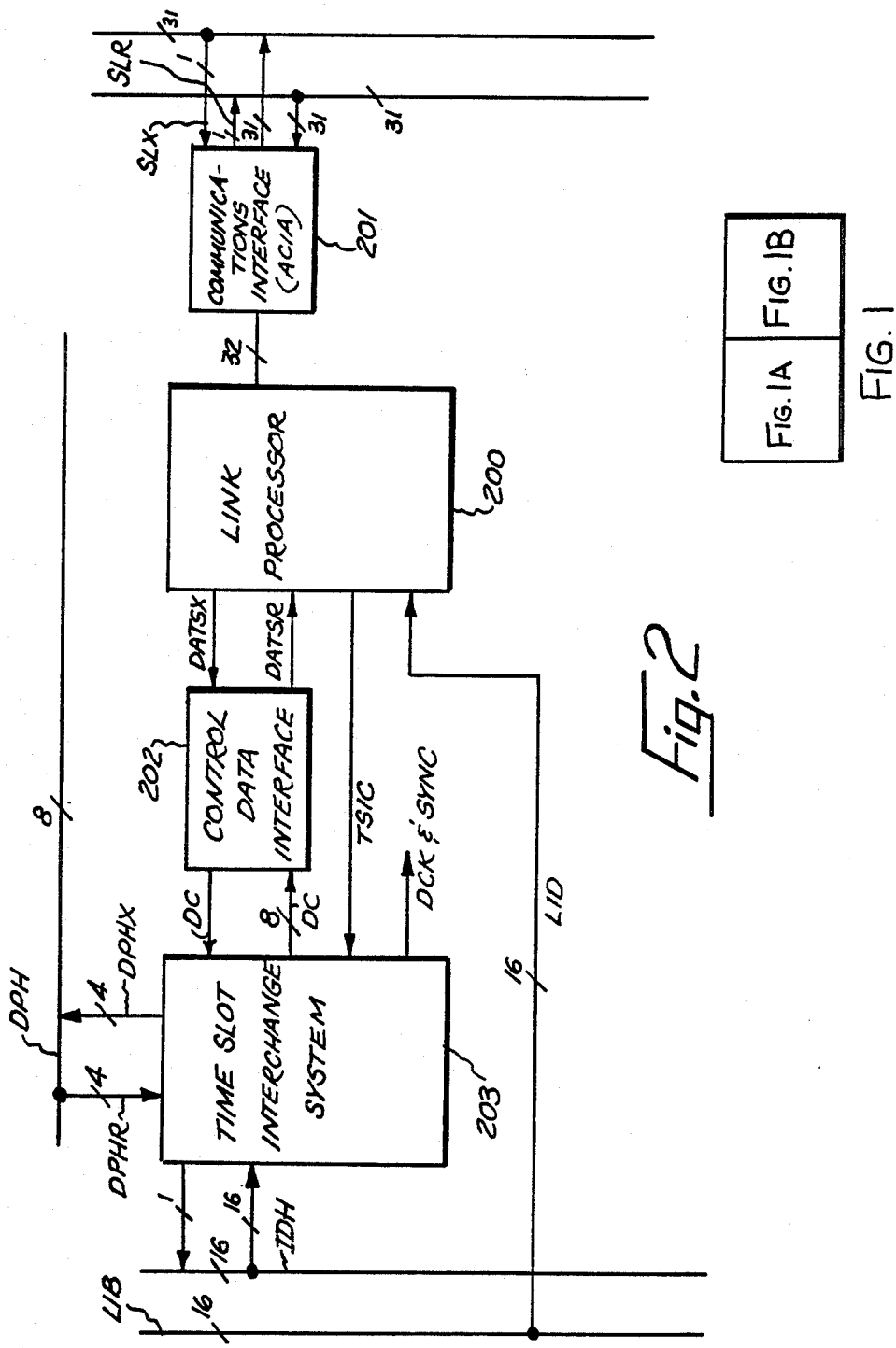

Fig.3A | Fig.3B

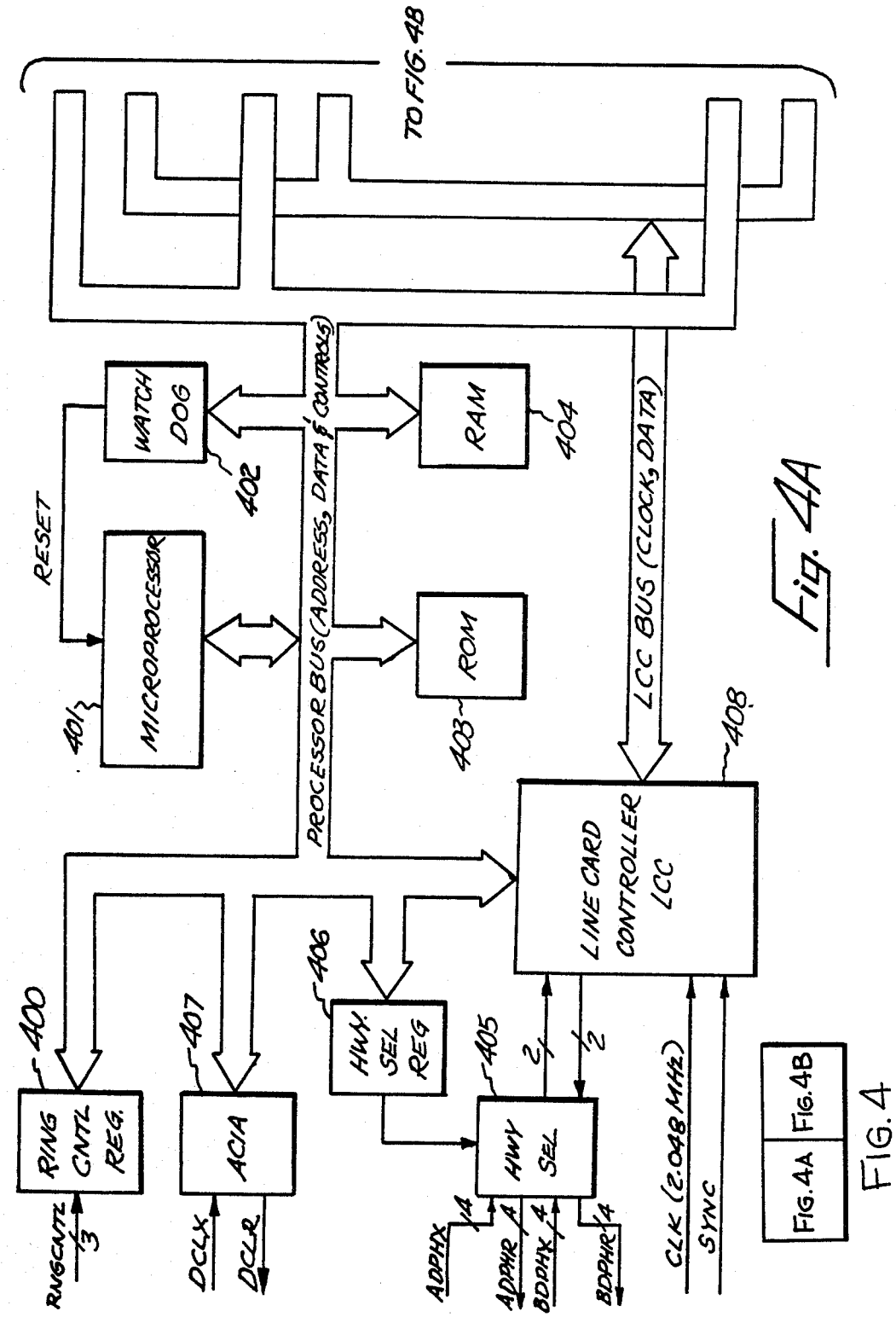

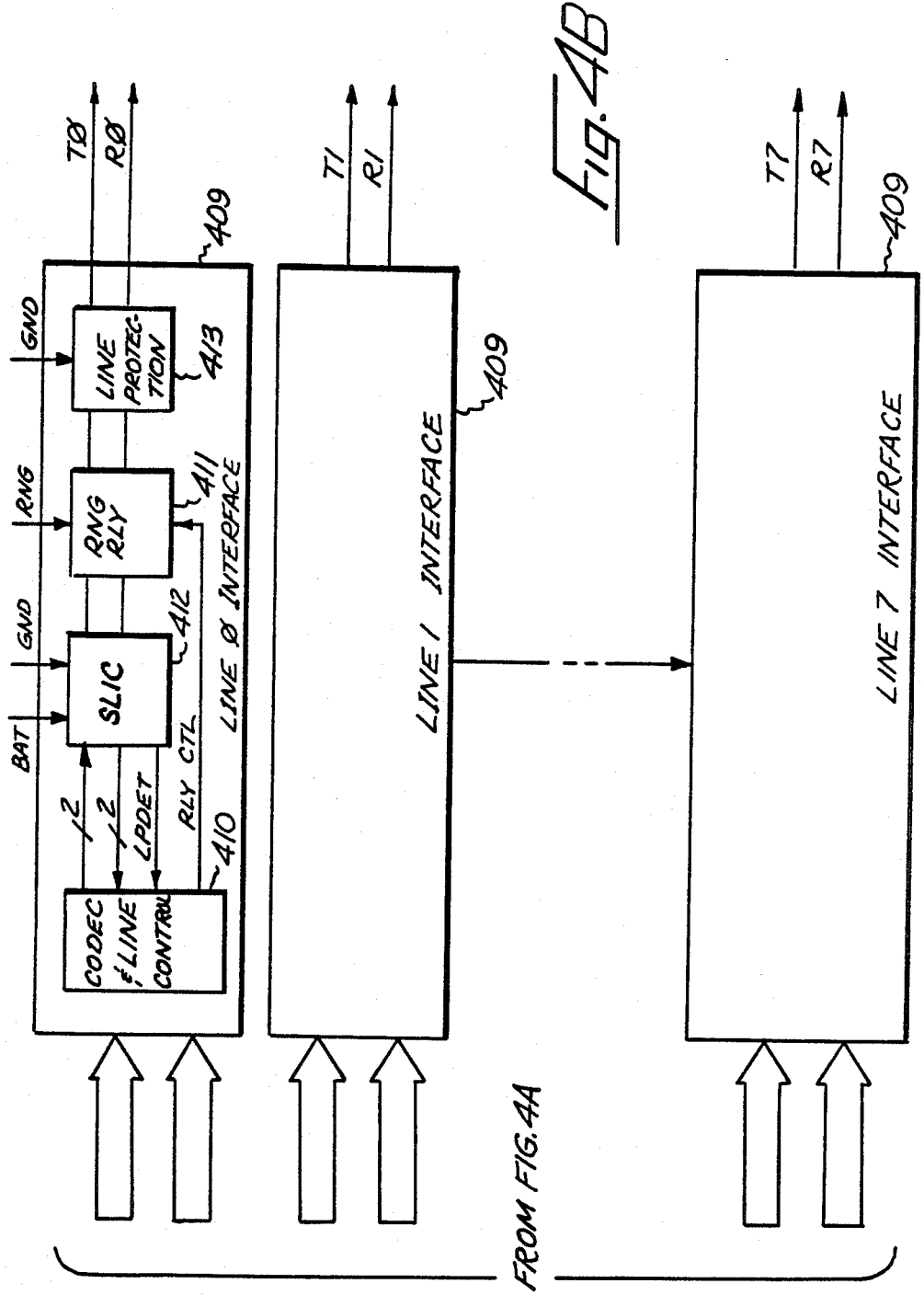

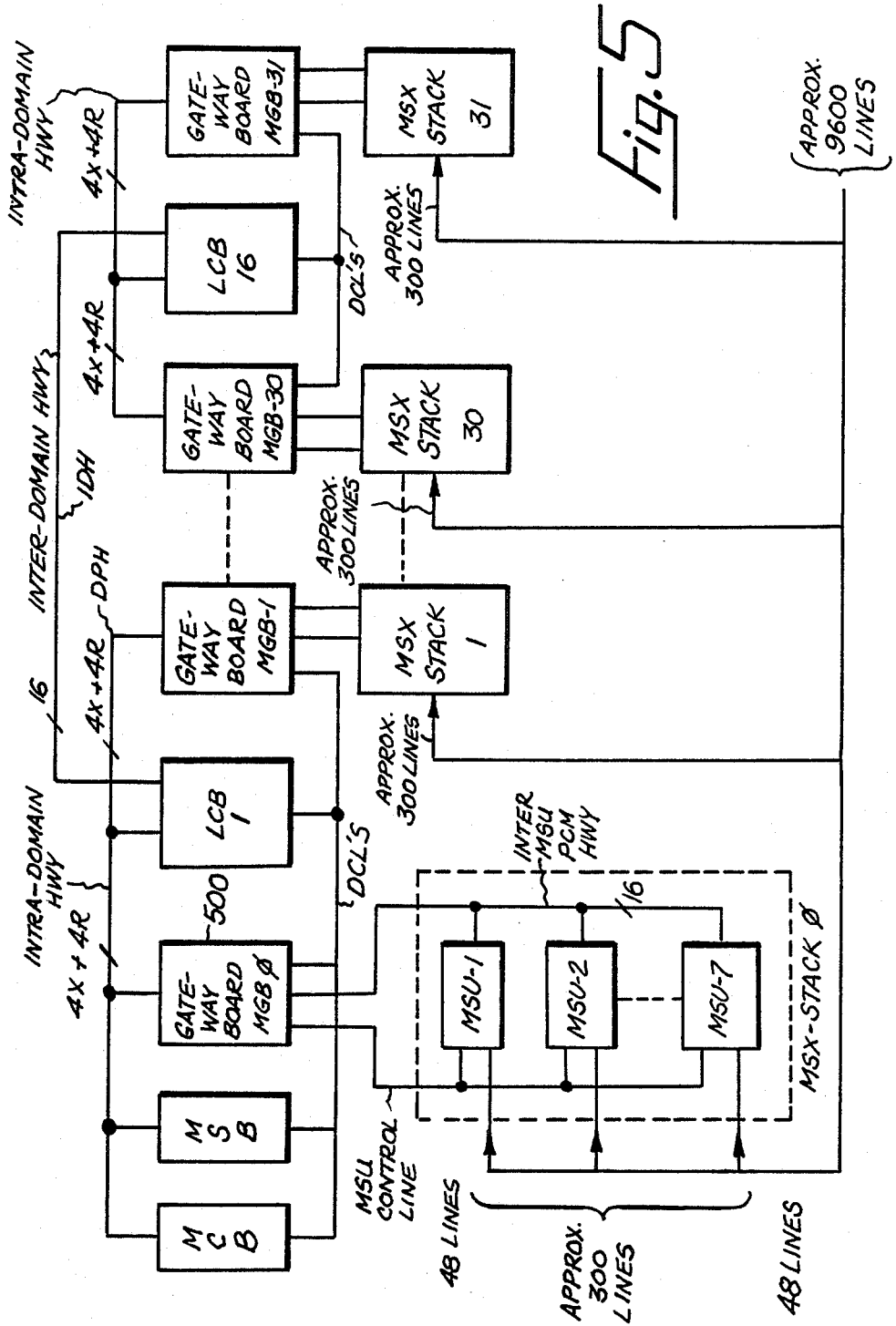

Figures 6, 6A:
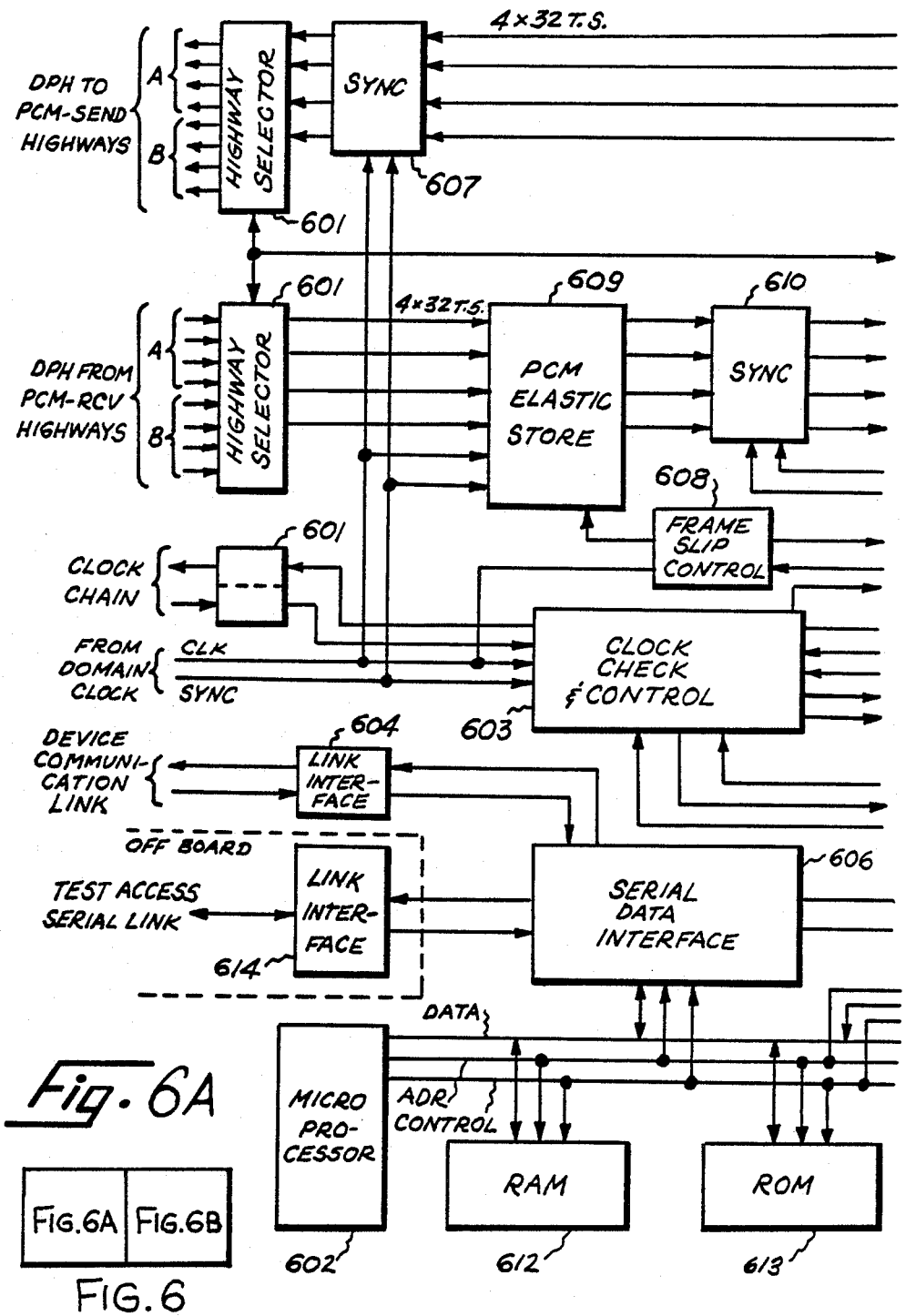
Figure 6B:
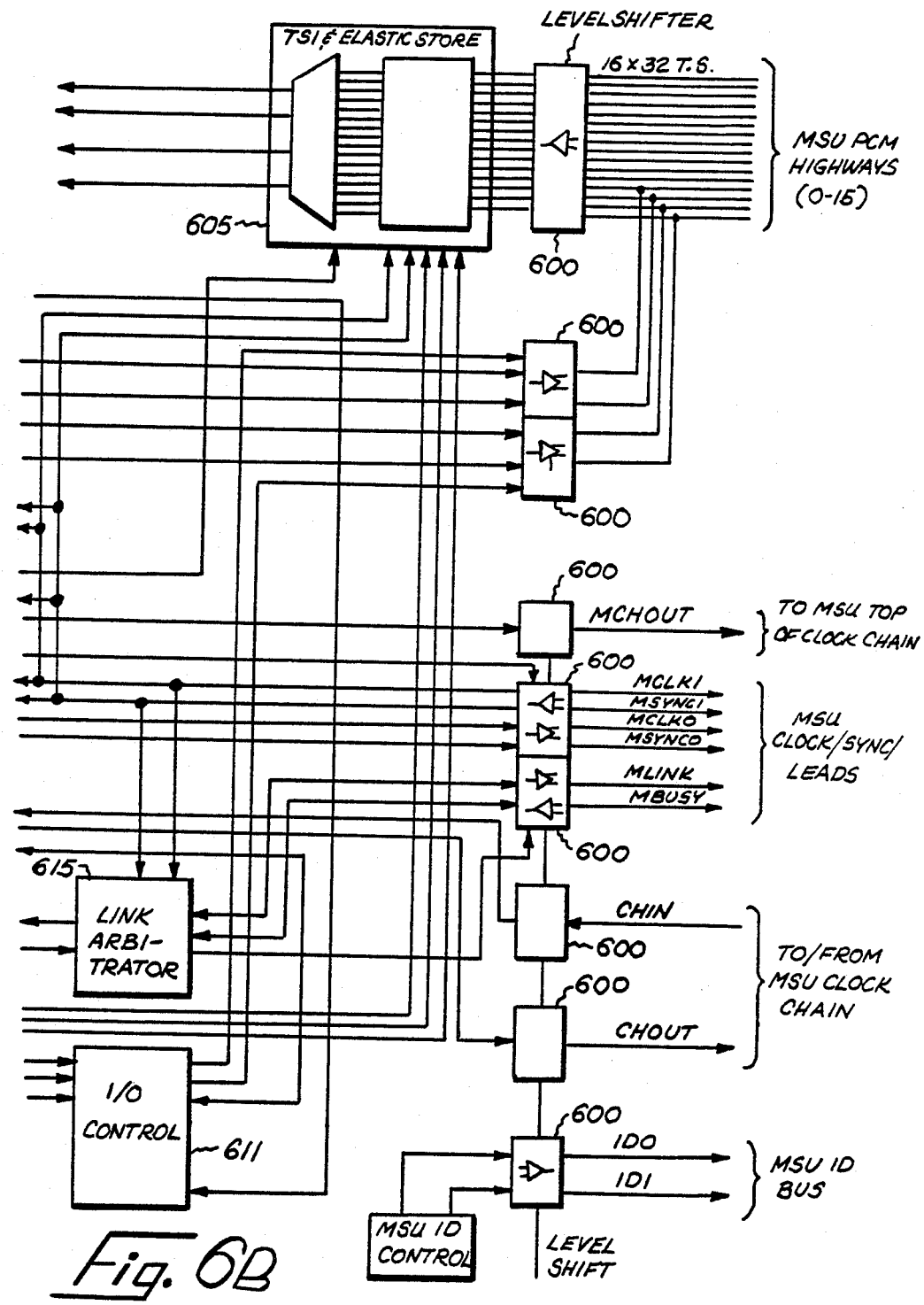

| Fig.6A | Fig.6B |

TIME DIVISION MULTIPLEX (TDM) SWITCHING SYSTEM ESPECIALLY FOR PULSE CODE MODULATED (PCM) TELEPHONY SIGNALS

The present invention relates to digital telecommunications systems, and particularly to time division multiplex switching systems which connect or route calls between users.

The invention is especially suitable for use in providing a medium size telephone switching system or exchange capable of providing switching service for between 500 and 10,000 terminations (subscribers or interconnecting trunks). The system may include several smaller size switching systems such as the modular digital exchange (MDX) sold by Redcom Laboratories, Inc. of Victor, New York USA and described in U.S. Pat. No. 4,228,536 issued Oct. 14, 1980, and integrates such smaller systems into a unified, expanded switching system or exchange.

Telecommunications networks are being called upon to transmit voice and data as well as to support other services. The signals which are transmitted are digital signals. Voice signals are pulse code modulated (PCM) digital signals. Digital signals may be derived from a wide variety of terminals and pass over various links, including via space satellites as well as conventional lines and trunks. A switchable digital data path capable of supporting such services is needed. The requirement is for a switch which is flexible so as to be useful as an exchange terminal to provide central office telephone service, as well as a customer, local exchange switch, such as a PBX. It is desirable that the size of the switch be flexible so as to expand with the size of the communications network and the channel characteristics which are needed to support different services which may require different bandwidths per channel. For example, high quality voice communication may require the equivalent of a 64K bps (kilobits per second) data channel. Data communications services, text message services, facsimile and television channels may require narrower or wider bandwidth channels. It is necessary that the switching system be flexible so as to provide the capability of supporting such services. Additional services and enhanced utilities such as call forwarding, camp-on, caller identification, simultaneous voice and data conversations between stations or end points connected through the switching system may also be needed. Such services and protocols are being established for the integrated services digital network (ISDN). It is a feature of the present invention to provide an improved TDM switching system which is expandable in size and also in the services and utilities which may be required from the telecommunications network.

Another requirement of switching systems which provide telephone services is reliability. A single fault should not cause catastrophic failure and shut-down of telephone service which is vital to the operation of an organization or to the functioning of a community. It is a feature of this invention to provide reliability in a switching system through the use of a combination of distributed resources which back-up each other so that when one fails another takes its place and only the failed device is affected. This is accomplished without excessive redundant hardware which might price the system out of the reach of many users, for example, as would be the case if a multiplicity of call processing computers each capable of establishing connections between any end points of the system were required.

The reliability of a switching system in accordance with the invention is also enhanced by the use of modular power supplies, ringing generators and other components which share common buses and can be readily replaced. Reliability is still further enhanced by the ease of implementing administrative changes without hardware replacements, such as replacement of memory boards, to update the system when lines are moved or added or when different services are removed or added. Reliability is still further enhanced through the use of diagnostic messages to determine the condition and availability of devices, such as service boards containing tone plant, ringing generators, and port boards (which interconnect with the lines and trunks).

An important feature of the invention is the adaptability of the system to expansion to increase the number of usable ports. This is accomplished with a bus protocol and system architecture which allows the interchange of boards, the addition of boards and even the interchange and addition of switching units such as the modular switching units of the aforementioned Redcom Laboratories MDX modular switching exchange, which is made up of modular switching units each called an MSU. It is also unnecessary with the switching system provided by the invention to dedicate a particular channel to a line or even to a remote system. Instead, special digital messages are used so as to allocate channels (time slots) as required.

The reliability and expansibility of a system in accordance with the invention are facilitated by utilizing the same links carrying control signals for signaling as are used for the communications channels. This reduces the overhead needed to maintain the communications paths and increases the expandability of the system. The signaling capabilities may also be expanded for the use of different devices and digital signaling messages and whenever expanded services are needed.

The modular switching system described in the above-referenced US patent utilizes multiple time slot interchanges, one for each switching unit. Each switching unit requires a processor, which processors are interconnected on a party line basis. The expandability of the system is limited, for example, to approximately 400–500 lines. This is satisfactory for small central office, many PBX and other switching applications, but is not expandable to providing connections at high speed when many more channels, channels requiring higher bandwidth and enhanced services, are needed.

A time division multiplex system in accordance with the invention has an architecture of independent and distributed elements which provide separate paths for signalling and control (call establishment, call progress monitoring, call termination, diagnostics and some administrative functions) and for communications channels principally handling the calls (the PCM voice or data signals). The elements are organized in separate domains connected by interdomain highways. The interdomain highways carry all of the high speed PCM data between domains. A link identity bus enables the domains to determine their position in the system. The interdomain highways carry a plurality of channels in cyclic series of time slots (frames). Some of these time slots in each series are used to send digital messages for signalling rather than the PCM voice or data signals (hereinafter called "calls"). These time slots are referred to as data time slots (DATS) and provide a high speed, variable size channel (using one or more time slots per frame) between domains. Each domain has a link controller and may have devices for interfacing lines and trunks (port boards) and devices for providing services and features, for example tones and ringing. Some of the domains may have telephony processors, which are call controlling computers that provide messages which establish the connections in time slot interchanges in the link controllers.

The devices are interconnected to their link controller by device communication links (DCL) which are separate and unique to each device and allows the link controller to communicate with and to determine the position of the devices in their respective domains. The devices and the link controller are also interconnected by a domain PCM highway, which is an intradomain highway carrying the call messages. This highway can be used for other high speed data transmission purposes; for example, to transfer data which modifies the data base in the telephony processor, which controls the establishment of calls and other services. Devices in the domains (gateway boards) may connect to modular switching units which are interconnected in a modular switching exchange, such as described in the above-referenced U.S. Pat. No. 4,228,536. The gateway board is connected to the intradomain highway, and via one of the device communication links to the link controller. The device communication links (DCLs) provide a bi-directional, serial data path between all domain locations (each device) and the link controller. The devices within a domain communicate with others in the domain by sending a digital signal over the DCL which connects it to the link controller. The link controller forwards the message via the appropriate device communication link to another device in the domain or over the interdomain highway to the link controller of another domain which then directs the message to the device addressed as the destination of the message.

A single physical shelf is preferably used for each domain (but can be used for a plurality of domains) and has a common back plane with buses which provide the DCLs and the intradomain highway. The system is modular in that the positions of the devices, which may be on different boards, are interchangeable, except for the position of the link controller, thereby facilitating replacement and enhancing reliability. Link controllers are also interchangeable among domains. The system is expansible by increasing the number of boards in a domain and by increasing the number of domains.

In a typical system a separate interdomain highway is provided for each domain which transmits to all domains via the link controller thereof. The interdomain highways are high speed highways operating at an eight megahertz rate. The intradomain highways may operate at a two megahertz rate. Each intradomain highway (which may have four transmit and receive lines) has cyclic series (frames) of 128 time slots. These time slots may be multiplexed on the interdomain highway which also has 128 time slots per frame, but which operates at the higher data rate. Common clock and sync pulses for the system may be generated in one of the domains (with switch-over, in the event clock from any domain fails, to the clock generated in another domain). The clock and sync are transmitted in the coding of the PCM signals on the interdomain highways (embedded clock and sync).

In a typical call set up operation, a port device which includes a microprocessor controller, sends a digital signal message via its device communication link to the link controller of its domain. The message is a packet with a header indicating how many bytes are in the message, the destination domain, location in the designated domain, a task identification within the location, a member within the task and the address of the sending port. The message also indicates whether it is to be broadcast to all domains or is to be sent to a specific destination. The link controller uses the address information in the message and can send the message out via a device communication link or via its time slot interchange to its interdomain highway. One or a plurality (e.g., from one to eight) of time slots in each frame may be dedicated to the control information which is sent via the interdomain highways. If a telephony process is required, the message is broadcast to all domains so that a domain having a telephony processor can receive the message. If several telephony processors are used, an available one is utilized in accordance with a priority protocol.

The telephony processor, utilizing the address of the originating port, generates a signalling message and sends it via its link controller on the signalling time slots (DATS) back to the domain having the originating port, which may require service. For example, this required service may be a request for dial tone. Using another signalling message, the port device requests the allocation of a time slot on the intradomain highway. An available time slot is allotted by the link controller. The device having the tone plant, whether in the same domain as the port requiring dial tone or in another domain, transmits a tone on the allotted time slot along the intradomain highway and on a time slot along the interdomain highway. Other telephony processes, such as collection of digits, setting up the time slot interchange to complete the path for the call and the termination of the call, are established and controlled by the digital messages transmitted via the device communications links and interdomain highways. Any two devices in any or the same domain can be connected via their respective link controllers. A processor in any domain can communicate with any device in any domain location via the device communication links and the link controllers. The system is efficient since it does not require a telephony processor in each domain. It is reliable because the clock and sync for the system are transmitted on the interdomain highways. There are, therefore, parallel sources and routes for clock and sync which enhances reliability. There is a separate unique device communication link for each device. If one device communication link fails, the failure of that device does not result in a catastrophic failure of the entire system or even of an entire domain.

In a typical system, each domain can handle 128 channels. Two modular switching exchanges each having approximately 300 channels can be handled by a single domain using a five to one concentration ratio. With an eight megahertz data rate (128 channels) and sixteen domains, up to thirty-two modular switching exchanges may be integrated and connected in a unified switching system serving approximately 10,000 lines. The switching system may contain different devices and elements in different mixes and combinations in each domain. In the event that channels requiring higher bandwidths are needed, more than one time slot per frame may be allocated to each channel.

In summary, a time division multiplex switching system in accordance with the invention, which establishes connections between ports in a communications network is comprised of means for defining first pluralities of cyclic series of time slots running concurrently on a first plurality of parallel highways (the interdomain highways). The system has means of generating second pluralities of cyclic series of time slots for call signals on a second plurality of parallel highways (the intradomain highways). The time slots of each series of the second pluralities correspond to different time slots of each series of the first pluralities. Means are provided for generating signalling messages respecting events for establishing the connections between the ports. Means are provided for assigning of the signalling messages to at least one time slot (a DATS) in each series (each frame) of each of the first pluralities (the time slots on the interdomain highways). Means are provided for allotting time slots, with the signalling messages, in the first pluralities of time slots (on the interdomain highways) other than those assigned to the signalling messages, and in the second pluralities of time slots (on the intradomain highways) for the communication of the call signals between the ports. Means are provided which are responsive to the signalling messages for making the connections between the ports in the allotted time slots. The signalling messages are communicated on separate and unique device communication links to and from the ports in their respective domains.

Figure 1B:
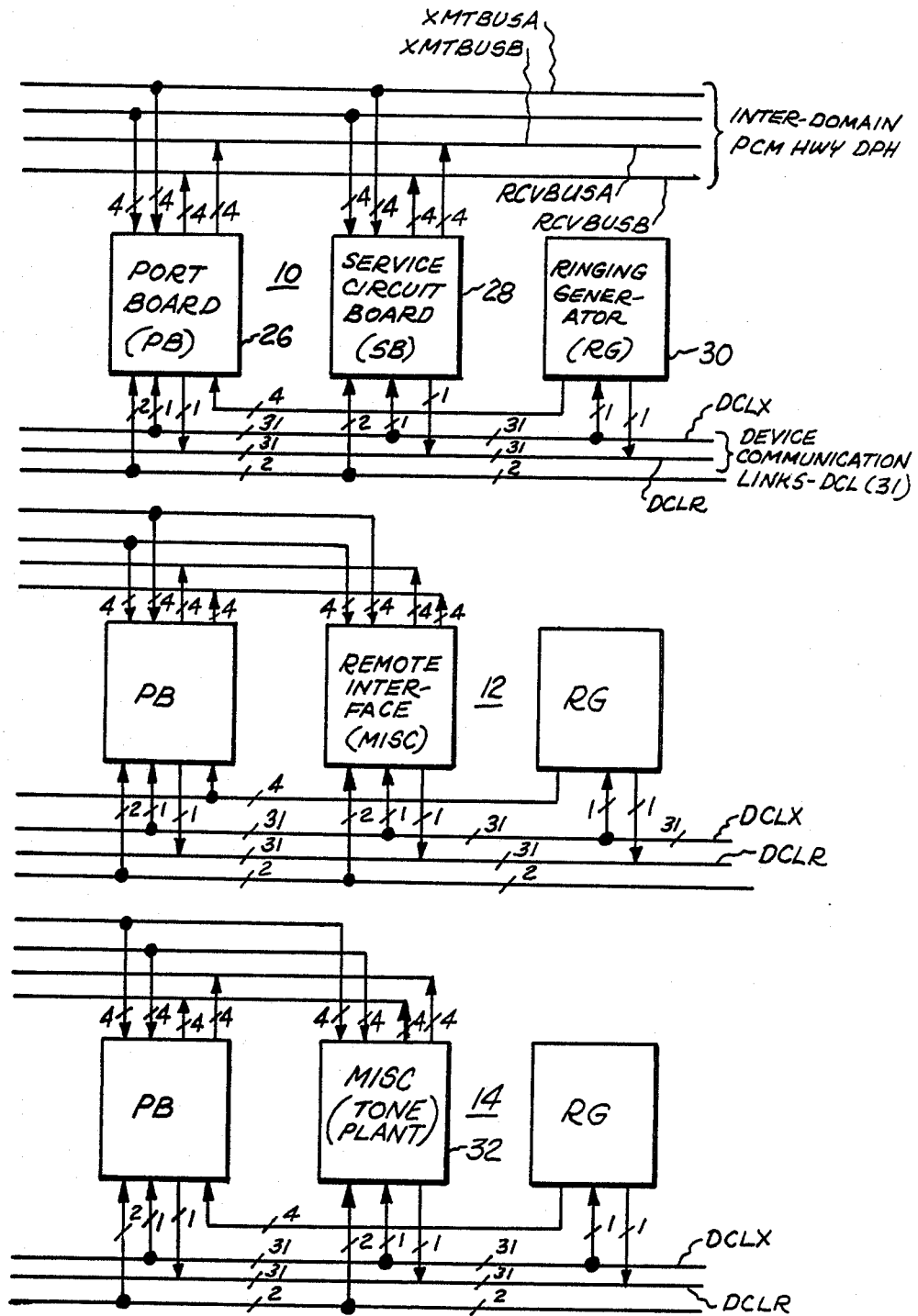
Figures 3, 3A:
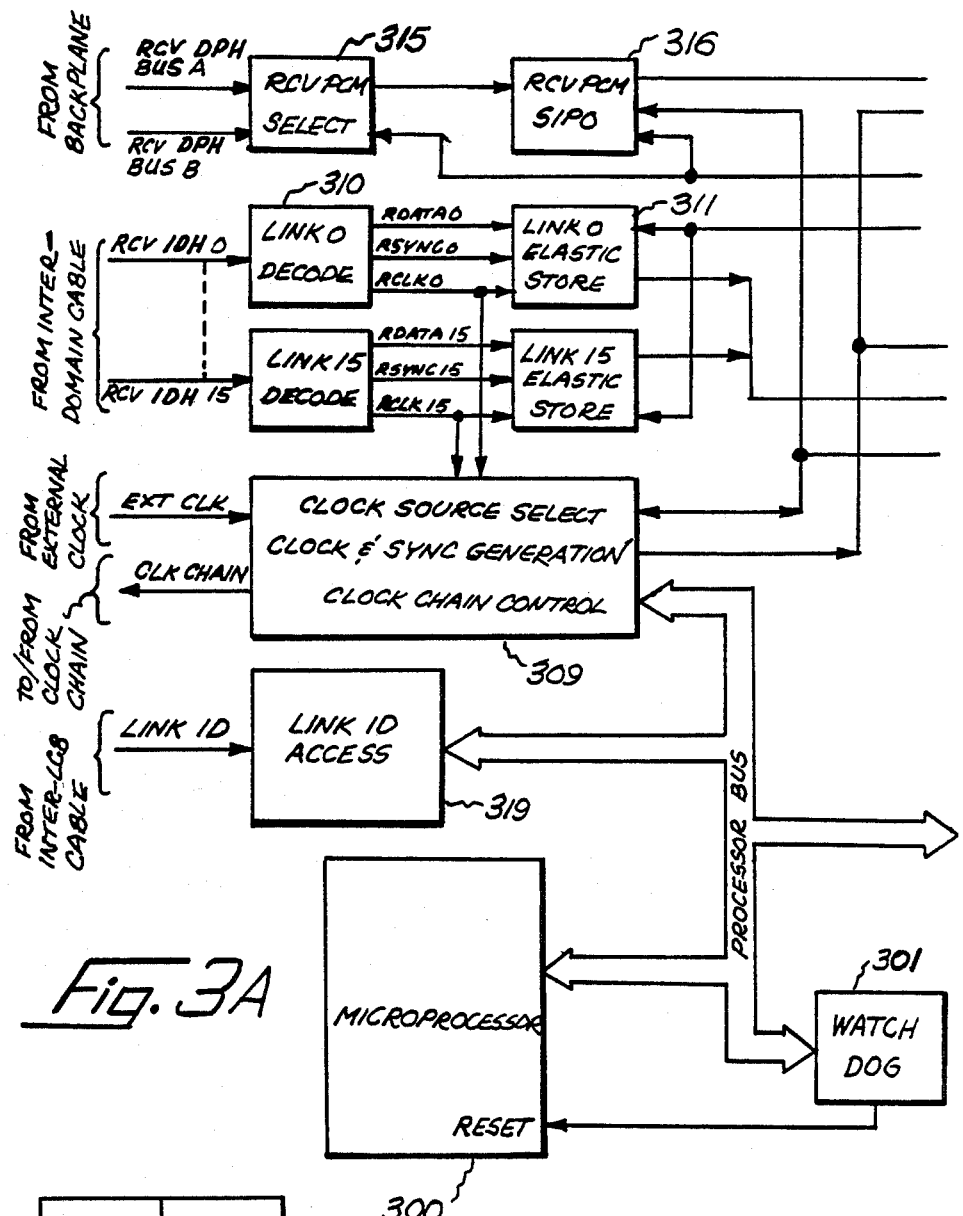
Figure 3B:
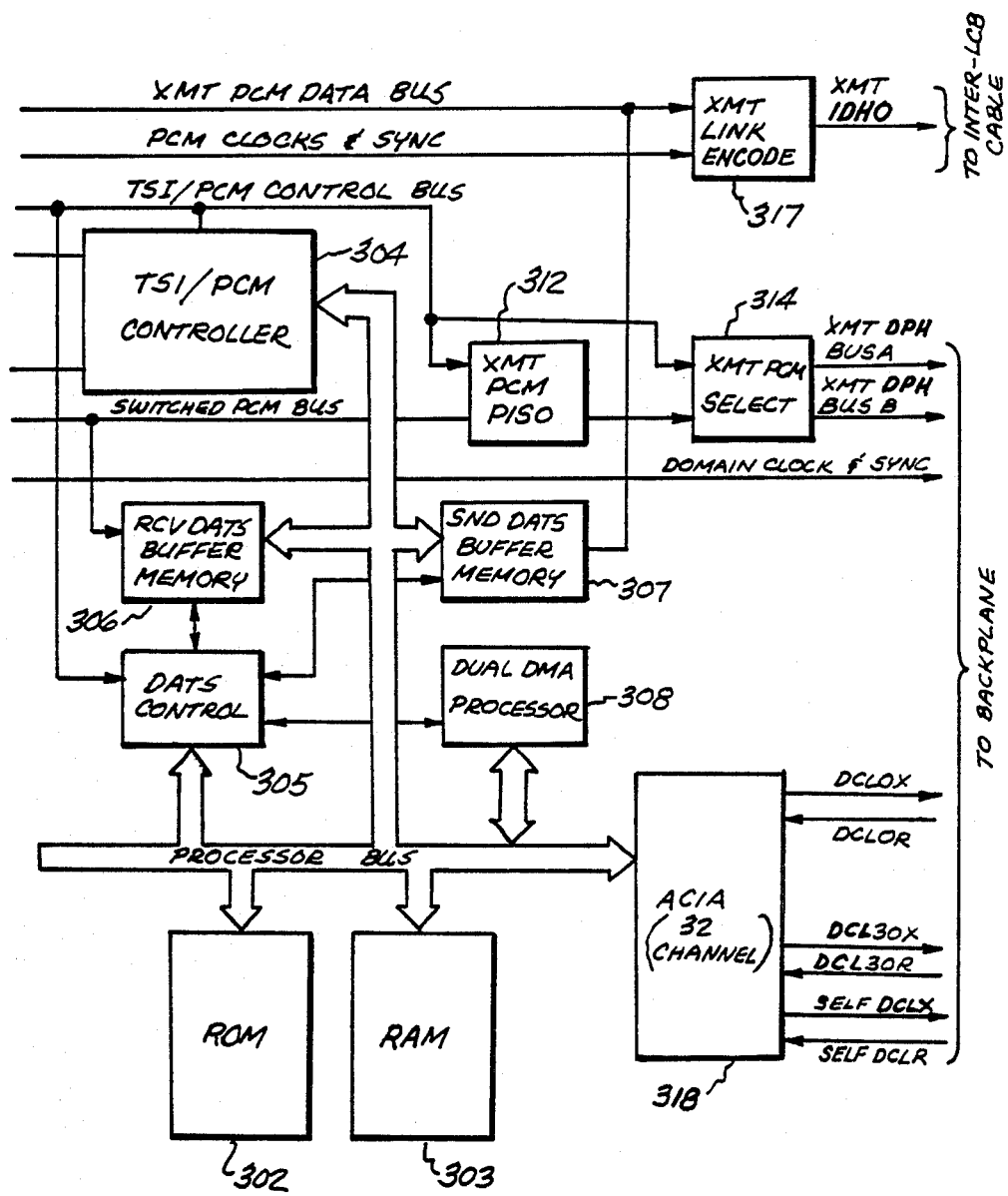
Figure 7:
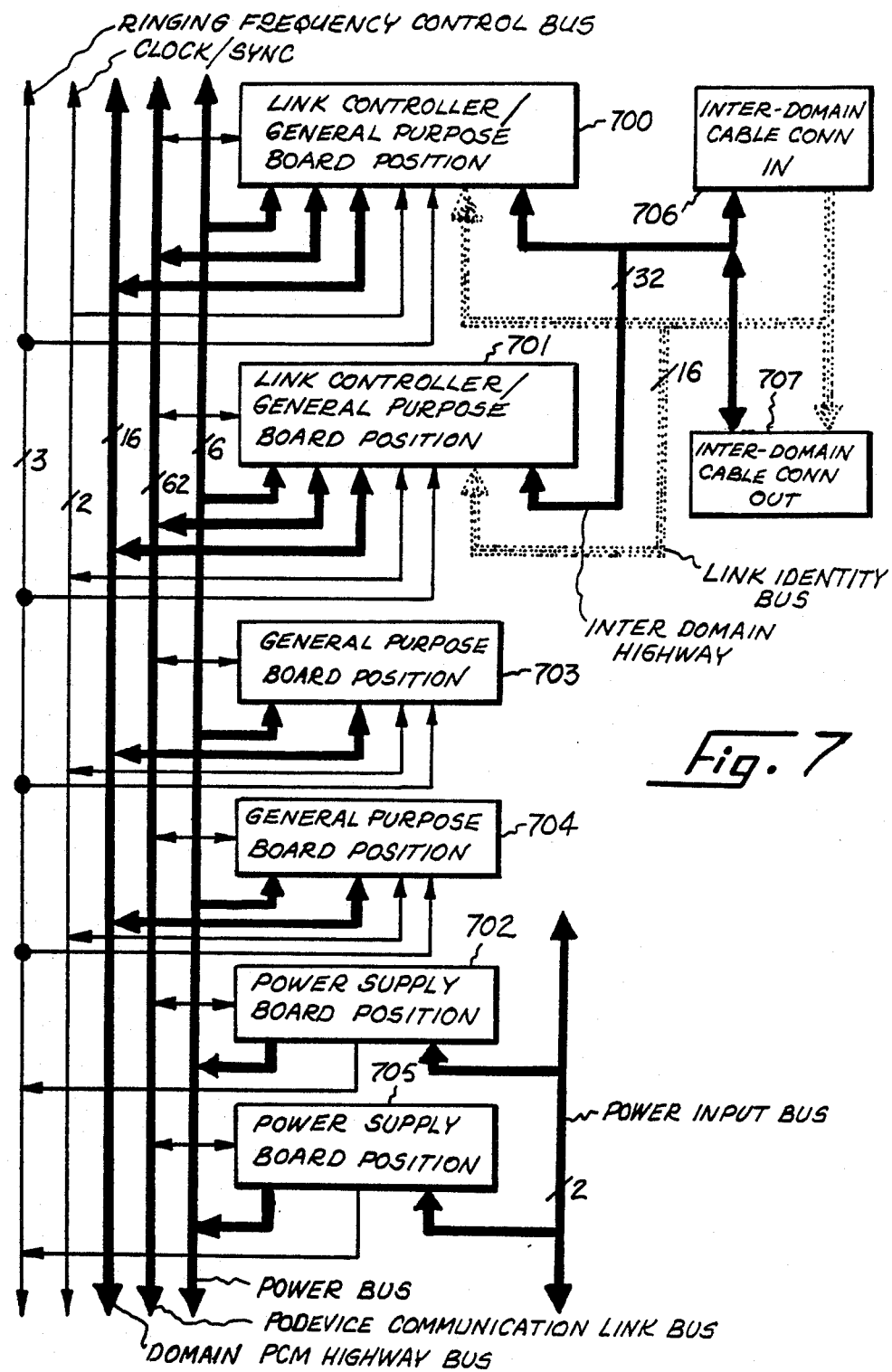
Figure 8A:
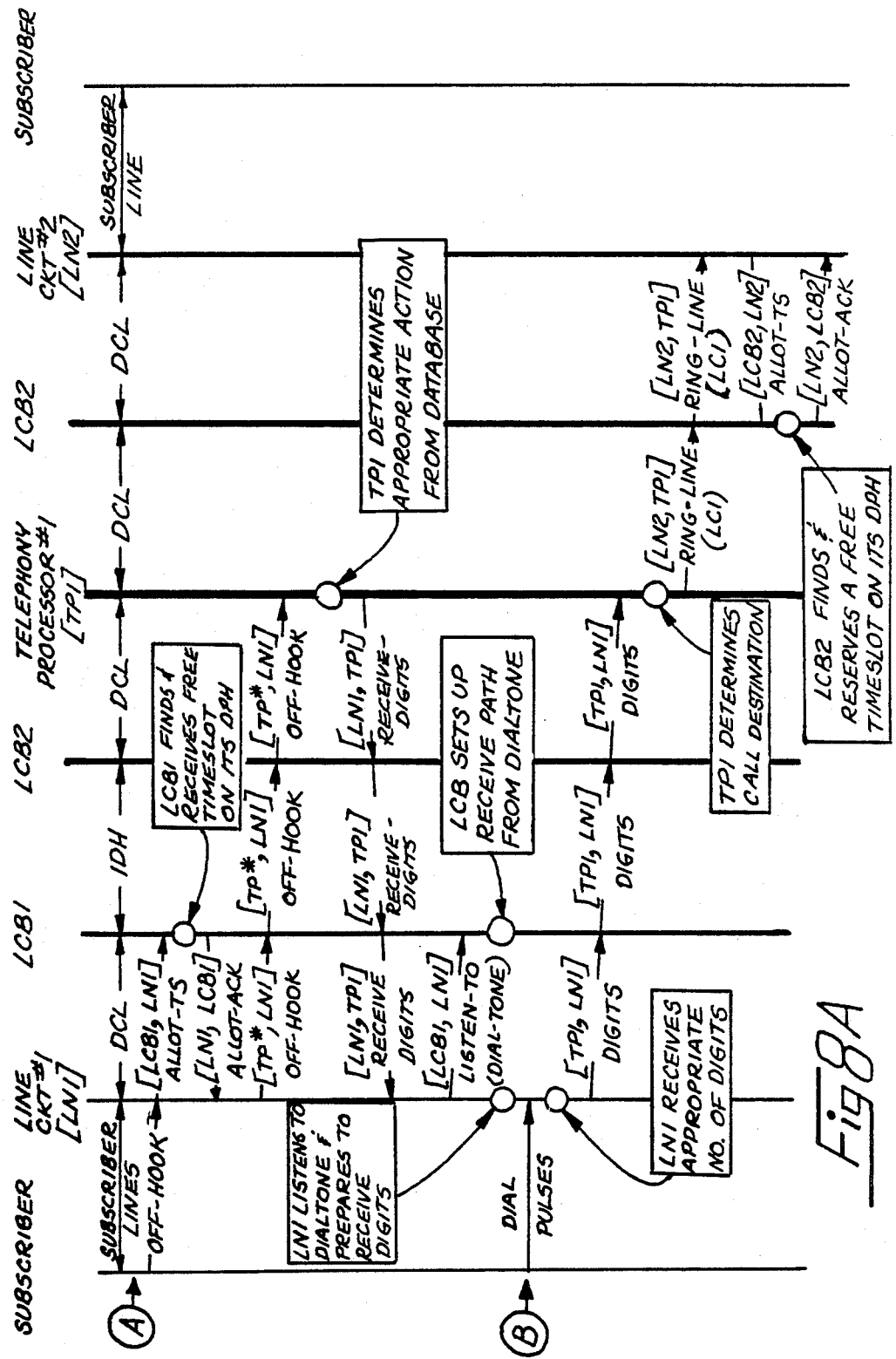
Figure 8B:
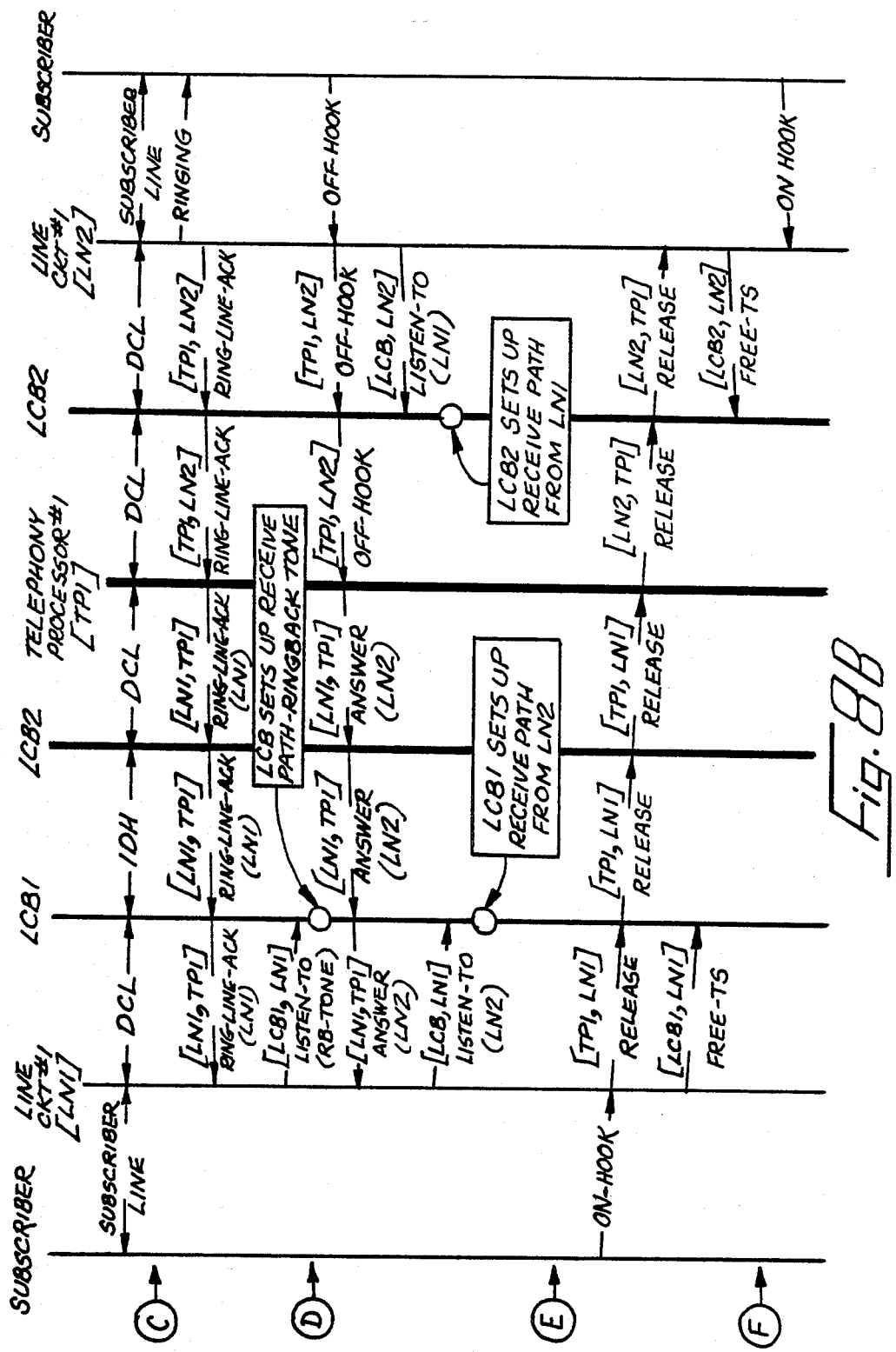

The foregoing and other features, objects and advantages of the invention as well as a presently preferred embodiment and the best mode now known for carrying out the invention, will become more apparent from a reading of the following description in connection with the accompanying drawings in which:

FIGS. 1A and 1B combined as shown in FIG. 1 is a block diagram of a TDM telephony switching system embodying the invention;

FIG. 2 is a block diagram of a typical link controller (LCB) used in the system of FIG. 1;

FIGS. 3A and 3B combined as shown in FIG. 3 is a more detailed block diagram of the LCB shown in FIG. 2;

FIGS. 4A and 4B combined as shown in FIG. 4 is a block diagram illustrating a port device, such as a port board (PB) illustrated in FIG. 1;

FIG. 5 is a block diagram illustrating a TDM switching system embodying the invention which unifies and integrates a plurality of modular switching exchanges of the type illustrated in the above-referenced U.S. Pat. No. 4,228,536 to provide switchable digital data paths for up to approximately 10,000 lines;

FIGS. 6A and 6B combined as shown in FIG. 6 is a block diagram of a typical gateway board which is used in the system shown in FIG. 5;

FIG. 7 is a block diagram illustrating the back plane of a portion of a shelf which can accommodate two LCBs; and FIGS. 8A and 8B are flow diagrams illustrating the progress of a connection in the TDM switching system shown in FIG. 1.

Referring to FIG. 1 there is shown a TDM switching system having different complements of devices in 16 different domains, three of which domains 10, 12 and 14 are illustrated. These are the first domain 10, the second domain 12 and the sixteenth domain 14. The modules or devices are the members of their respective domains. Like types of devices are identical; therefore the modules may be interchanged. Each domain centers around a link controller, which is a combination of interconnected elements, preferably on a board. The link controller is, therefore, referred to as the link control board. The link control board 16 in the first domain 10 is referred to as LCB-1. The link controller 18 in the second domain 12 is referred to as LCB-2 and the link controller 20 in the sixteenth domain is referred to as LCB-16. The link controller is the hub through which all communications for a domain must pass.

In the illustrated embodiment, the link controllers are connected to 16 interdomain highways (IDH). LCB-1 transmits along interdomain highway 0, and is linked to that highway to receive its own messages. Highway 0 also connects to the link controllers of all of the other domains and communicates with them over interdomain highway 0. Similarly LCB-2 transmits on interdomain highway 1. It has a path for receiving its own transmissions on that highway and is connected to all the other LCBs. Link controller 16 transmits on highway 15, receives its own transmissions from that highway and is connected to all the other LCBs via highway 15 for communication therewith.

There is a link identification bus which allows each LCB to determine the number of the domain in which it resides by providing a unique indication to the LCB for each domain in the system. This unique indication is provided by a ground applied on a bus at an ever increasing pin location. The ground is wired into the first domain 10 on the lead in the least significant position. This ground runs along the bus and shifts (slips) to an ever higher lead as it progresses along the cabling. At domain 10 it is on lead 0. At domain 12 it is on lead 1. Slippage continues until at the sixteenth domain 14 ground is at lead 15. The domain number will be equal to the number of the highest numbered lead with the ground. The LCBs are therefore able to determine their own location and to detect when a signalling message (a packet) is addressed to its domain and will enable the packets to be addressed to the appropriate domain by the domain number. This link identification system is similar to that described in the above-referenced U.S. Pat. No. 4,228,536 (see FIG. 8A of the patent).

The number and types of devices (the domain members) are determined by the requirements of the system. In addition to the LCB, there may be up to 30 additional members in the domain.

A common back plane contains the wiring which interconnects the domain members and also connectors for the interdomain highway and the link identification bus. A back plane is shown and will be described in greater detail in connection with FIG. 7. One of the four illustrated members of the first domain 10 is a telephony processor which controls signalling and the connections through the communications networks of the system. It contains a microprocessor and a memory and is connected to the back plane or interconnection board. The telephony processor with its microprocessor and memory 22 is referred to as the MPB. Each domain need not have an MPB. For faster operation and reliability, a plurality of MPBs may be used in the system. Another MPB 24 is in the sixteenth domain 14. Since the system is modular the MPBs may be identical.

A port board (PB) 26 is also located in the first domain 10. This board contains line circuits which connect to telephone lines and trunks which are switched and interconnected by the system. The port boards may contain several line circuits, suitably eight, or several trunk circuits, suitably four. The line circuits will be discussed in greater detail hereinafter in connection with FIG. 4. Another member of the domain may be a service circuit board (SB) 28 which may contain tone signalling receivers and senders, voice conferencing or other service circuits which may be necessary or desirable in a telecommunication system. The first domain 10 also includes a ringing generator (RG) 30, and each domain which has a port board with line circuits desirably includes a ringing generator. Ringing current of different frequencies, for example eight different frequencies for party line applications, is extended along a ringing current supply lead on the back plane which is connected to the ringing generator and to all device positions on the back plane, together with ring control leads which carry codes corresponding to the frequency of the ringing current then being generated. The ringing current supply lead and the ringing control leads are illustrated as a single line in FIG. 1 for the sake of simplicity.

Each domain preferably includes a plurality of power supplies which provide operating power of different voltages as required by the boards of the domain. Each power current is carried along a different lead on the back plane and connected via the back plane connectors to the domain members (boards). The power supplies share the load and may be redundant to enhance reliability.

The second domain 12 includes a remote interface which may connect to peripheral equipment or to a T-1 trunk which connects the illustrated system to another office. Another miscellaneous member 32 is included in the sixteenth domain. This member may contain the tone plant for generating dial tone, busy tone and other telephony tones. A feature of the system is its flexibility in allowing the selection of various different domain members in each domain.

The PCM data and other data is transmitted on intradomain highways. These may be referred to as the domain PCM highways (DPH). There are two such highways which are indicated as the A and B highways. The A highway has a four-wire transmit bus and a four-wire receive bus (XMT bus A and RCV bus A) the other highway has four transmit and receive lines each (XMT bus B and RCV bus B). In a typical system only one DPH will be selected. The A and B highways are, optionally, partitioned into three sections each which can provide for up to six domains, each of which is connected to or shares the same back plane. This arrangement increases the packing density and can reduce the physical size of the system. A back plane and its domains constitute a shelf of the system.

Each of the LCBs generates clock and sync signals which are transmitted along its interdomain highway, encoded into the bits (digital signals) which are transmitted along that highway. These signals are extracted by the other LCBs and used to locate the time slots and read the PCM data, and, optionally, used to generate clock and sync pulses which are transmitted to the domain members along separate clock and sync leads. There may be other sources of clock and sync which supply the clock and sync leads. These sources may be located in the devices of the domain. An external clock source may also be used. Optionally, if two or more LCBs or other clock sources are in a shelf, these clock and sync sources may be connected via a clock chain such that if one source fails another can take over. Such clock chains are similar to that described in the above-referenced U.S. Pat. No. 4,228,536 and also in U.S. Pat. No. 4,229,816 issued Oct. 21, 1980 to Charles J. Breidenstein et al. If a hard wired clock chain is not used, switch-over from one source to another may be under software control.

The LCB and the other members of a domain are connected by device communication links (DCL). There are 31 such links on a back plane. Communication between the members of a domain is accomplished by the use of the DCLs. The DCLs are bidirectional serial links. There are 31 possible paths for transmissions from each domain member to the LCB of each domain, which path is chosen depends upon the location of the domain member (where it is connected) to the back plane. There is a separate connector in each of the locations. The unique leads for signals received by the LCB from the domain members are referred to as DCLRs. The unique leads for signals transmitted to the domain members from the LCBs are referred to as DCLXs. A unique one of the thirty-one DCLR leads and a unique one of the thirty-one DCLX leads are reserved for self-links SLR and SLX. The LCB receives its own transmission over its SLX lead and transmits on the SLR lead for reception on the unique one of the DCLRs. The connection of the self leads to unique ones of the DCLRs and DCLXs provides identification information as to the location of the LCB in its domain, as well as bi-directional communication.

The location of each member in the domain is defined by the DCLs. Each domain location has a unique DCL link; therefore the domain location is equivalent to the number of the DCL connected to the location. This number enables all the domain members and the LCBs to be addressed and signalling messages directed to specific locations. On initialization a signalling message identifying a signalling event called Are You There (RUTH) obtains identifications via the DCLs of the type of member (the board type) at each domain location. A map of these addresses is stored in the LCB and is used to route signalling messages. The operative board members can have a processor (a microprocessor chip and memory) for generating and responding to signalling messages.

There are two main communications networks within the system. These are the interdomain highway and intradomain highway (IDH-DPH) network for call data and the DCL-DATS packet network for signalling messages. The DATS are dedicated time slots, preferably one or more of the last eight time slots of each frame which is transmitted on the interdomain highways. These DATS time slots and the DCLs provide a network for the transmission of signalling messages or packets. This packet network is used to communicate control information for call control. It can also be used for the transmission of packet data between subscribers so as to provide enhanced facilities, for example access to terminals and other peripherals as may be required by the Integrated Services Digital Network (ISDN) protocols.

In the IDH-DPH network for call data, the IDH carries all the PCM highways for all domains. Since the IDH has multiple highways which are bused to all domains in the system, each domain will send its call data (PCM voice/data channels) on a single highway of the 16 IDH highways. It will receive from all 16 IDH highways, i.e., from the other domains as well as channels for its own domain. Therefore the system provides full availability of all PCM time slots (all channels) throughout the system. In the preferred embodiment the 16 IDH highways each operate at a rate of 8.192 megabits per second. Each individual time slot operates at a 64 kilobit per second rate. Each of the 16 IDH highways carries 128 time slots. Each 128 time slot group (a frame) is cyclic in its occurrence. The DPH highway consists of four transmit and receive pairs each of which carries 32 time slots and operates at a 2.048 Mbps rate. There are a total of 128 PCM time slots on the DPH.

There is a dynamic allocation of time slots to the members of each domain each time they require a channel (a voice/data communications path). These time slots are freed for other uses when no longer required. The DPH time slots may also be used to down-load or up-load program and/or data base information to or from the telephony processor (MPBs 22 and 24). The LCB in each domain maintains a data base which stores information as to which of the time slots are in use, thereby enabling the LCB to allot free time slots to domain members on request.

The DCL-DATS packet network utilizes the unique DCLs. The LCB is the only member in a domain that has access to all the DCLs in its domain and can communicate with all locations. The LCB has a time slot interchange which functions as a dual time slot interchange for the call data network, making connections between the IDH and the DPH as well as connections between the up to eight DATS on each highway (8×16 or 128 DATS per frame) and the domain members. There is therefore full connectivity for call data and signalling messages throughout the system. This connectivity provides the following features: (a) complete flexibility for the placement of various member (board) types in the domain at any domain location; (b) the failure of a domain member in a location can only affect the DCL to that location and does not cause a catastrophic failure either in the domain or in the system as a whole; and (c) the serial star connection over the DCLs may readily be implemented on the back plane.

Since the signalling messages (packets) are sent between domains on time slots over the IDH highways and can use more than one time slot, a variable size channel can be created. The signalling messages or packets may have several eight-bit bytes which are transmitted on more than one time slot in a frame or on time slots in successive frames. The messages may contain up to 256 bytes. In practice all such capacity for the message is not expected to be necessary, each packet of the message may contain a maximum of 32 bytes. The header may be 10 bytes followed by data bytes. In the case of the MSU Expansion System, which will be described hereinafter in connection with FIGS. 5 and 6, and which utilizes the MSU stacks described in U.S. Pat. No. 4,228,536, the header may contain 16 bytes. The remaining bytes are then data bytes. The format for a header is shown in the following table:

+F-E-D-C-B-A-9-8-7-6-5-4-3-2-1-0+byte

| COUNT / event | 0,1 |
|---|---|
| dCLST /h/ dDMN/ dDLOC | 2,3 |
| dDLT / dDLM | 4,5 |
| sCLST /s/ sDMN / sDLOC | 6,7 |
| sDLT / sDLM | 8,9 |
| data byte / data byte | A,B |
| . . . | | h is the dhtype field.
s is the sspare field.

The bytes in each field identify address information, the control function or event, the task and the location of the circuit which will perform the task. One field is a one bit field called the dhtype field (destination header type). It is one bit which identifies whether the packet is to be broadcast to boards of a specific type or directed to a specific address. The 0 byte is the count field, a number which indicates the number of bytes in the packet and can be used to allocate memory space in the DATS receive buffer memory which will be discussed in greater detail in connection with the LCB (FIG. 3). The S bit is the spare field which allows for further expansion and is needed to fill out the sixth byte.

The event is the action reported or requested to be performed. There are various events each with its own number. Some of the events are to allot a time slot, (ALLOT-TS). Another event is the acknowledgment of the allotting of a time slot (ALLOT-ACK) which will carry the time slot number. Other events dealing with call processing tasks are a negative acknowledge (NAK ALLOT-TS) when a time slot is not available. Still another event is to free a time slot (FREE-TS). Still another event is to listen to a time slot or to a channel (LISTEN-TO-TS). Still other events dealing with call processing are to read or be connected to a time slot (READ-TS) and to acknowledge that a time slot is to be read (ACK-READ-TS). Many of these packets are generated in the telephony processor or MPB.

A dCLST field identifies a cluster number. The system may be expanded by having separate clusters, each, for example, including a sixteen domain TDM system such as illustrated in FIG. 1. The cluster field may be used for further expansion of the illustrated TDM system if warranted by customer requirements or applications.

The dDMN field is the destination domain. This will be the LCB number as identified by the link identification bus. The dDLOC field is the location in the destination domain which is identified by the connection to a unique DCL.

If the h (destination header type) bit is set, the dDMN and dDLOC fields define the board type to which the message is directed. If the dDMN field is 0, the packet is a broadcast message which goes to all boards of a specific type in all domains, the dDLOC field indicating the board type to which the packet is directed. Other directions for broadcast messages can be defined by different dDMN and dDLOC codes. If the h bit is cleared, then the dDMN and dDLOC fields are the actual address location for the message.

The dDLT field is the destination domain location task. This represents a subroutine in a domain location processor program which affects the process in the handling of an event, such as ringing of a line, extending dial tone, etc. The domain location processors have multi-tasking operating systems. A task number is assigned to each task. The system operates in response to the message to execute the task. The messages may be stored in an input queue in a domain location's memory (RAM). The processor in a domain location accesses the packet to perform the task; for example the allotting of a time slot, freeing of a time slot, etc. Multiple messages for carrying out different tasks may be broadcast, for example to all of the telephony processors. The processors are programmed so as to allocate themselves to the messages. A suitable program may be based upon the domain location number with the telephony processor (MPB) in the first domain servicing the message unless it is busy, in which case the telephony processor in the next higher number domain will be enabled to carry out the task.

The destination domain location member field (dDLM) is provided for multiple operations within a task. For example, a task may involve the ringing of a phone connected to a line circuit in a port. The member will enable the task to be carried out on a specific line circuit. The member in the task, like the task itself, is defined by a software routine which is called up by the dDLM byte.

The sCLST, sDMN, sDLOC, sDLT and sDLM fields are similar to the destination fields, but are the source equivalents. These fields enable a return or acknowledge message to be sent in the same language (code) required by the sending source. An acknowledgement may then simply be transmitted by the received event message code. The negative acknowledge may be transmitted by incrementing this message by unity (1). This provides for independence of operation and a unique check on the operation of each device, since differentiation between an acknowledge required by a particular source from acknowledgements required by other sources may readily be accomplished. This enables hundreds of messages and their acknowledgements to be handled, and allows effective utilization of memory space in the processor's RAM.

The data bytes are part of the 32 bytes in a packet and may be used to designate the particular time slot which is allotted or to designate certain operations in peripherals. These data bytes may be ASCII bytes or strings of ASCII bytes as required by the control protocols of the peripherals.

In addition to connection events there may be administration and maintenance events. The administration event RUTH mentioned above is a maintenance event which can be used upon initialization or "boot-up" to determine the identity of the boards and the board type. The following tables set forth the packet identifications and designations of the RUTH and RUTH ACK packets.

| | RUTH | |
|---|---|---|
| Name = | Are You There | |
| Event = | RUTH | |
| Function = | To determine the presence of a board in a slot | |
| Reason = | On boot-up until the LCB has determined the identity of all boards in its domain. Also after a board has "gone away". | |
| Direction = | LCB to Board | |
| Checks = | None | |
| Possible Responses = | RUL_M | |
| dclst = | [this cluster] | |
| dhtype = | DIRECTED | The message is directed |
| ddmn = | [this domain] | |
| ddloc = | n | n rotates through all members of the domain |
| ddlt = | MAINTENANCE_T | |
| ddlm = | n/u | Not used |
| sclst = | [this_cluster] | |
| sdmn = | [this_domain] | |
| sldoc = | [this_dlocation] | |
| sdlt = | MAINTENANCE_T | |
| sdlm = | n/u | |
| event = | RUTH | |

| | RUTH_ACK | |
|---|---|---|
| Name = | Acknowledge a RUTH event | |
| Event = | RUTH_ACK | |
| Function = | Indicates the presence of a board in a slot | |
| Reason = | Response to an RUTH event | |
| Direction = | PORT to LCB | |
| Possible Responses = | None | |
| dclst = | [sclst] | |
| dhtype = | DIRECTED | |
| ddmn = | [sdmn] | |
| ddloc = | [sdloc] | |
| ddlt = | MAINTENANCE_T | |
| ddlm = | n/u | |
| sclst = | [this_cluster] | |
| sdmn = | [this_domain] | The board will derive this info |
| sdloc = | [this_dlocation] | from the header of the received RUTH |
| sdlt = | MAINTENANCE_T | event. |
| sdlm = | n/u | |
| event = | RUTH_ACK | |

| | -continued | |
|---|---|---|
| data[0] = | [source board type] | The board type of the source board |

Another maintenance event packet is the RUL M packet which determines whether a member (a board) in a slot (or location) on the shelf is present and operating. The RUL events may be sent out periodically in order to provide continuous self-diagnosis of the system.

The call processing message time slots will be apparent from the ALLOT TS, ACK ALLOT TS, NAK ALLOT TS, FREE TS, READ TS and ACK READ TS formats which are set forth in the following tables.

| | RUL_M | |
|---|---|---|
| Name = | Are You Well | |
| Event = | RUL_M | |
| Function = | To determine the continued presence of a board in a slot | |
| Reason = | Periodically generated to guarantee board presence | |
| Direction = | LCB to PORT | |
| Possible responses = | None | |
| dclst = | [this_domain] | |
| dhtype = | DIRECTED | |
| ddmn = | [this_domain] | |
| ddloc = | n | n rotates through all member of the |
| ddlt = | MAINTENANCE_T | domain. All boards support this task. |
| ddlm = | n/u | |
| sclst = | [this_cluster] | |
| sdmn = | [this_domain] | |
| sdloc = | [this_dlocation] | |
| sdlt = | MAINTENANCE_T | |
| sdlm = | n/u | |
| event = | RUL_M_ACK | |

| | RUL_M_ACK |
|---|---|
| Name = | Acknowledge Are You Well |
| Event = | RUL_M_ACK |
| Function = | Acknowledges that things are as they should be |
| Reason = | Response to RUL_M |
| Direction = | PORT to LCB |
| Possible responses = | None |
| dclst = | sclst |
| dhtype = | DIRECTED |
| ddmn = | sdmn |
| ddloc = | sdloc |
| ddlt = | MAINTENANCE_T |
| ddlm = | n/u |
| sclst = | [this_cluster] |
| sdmn = | [this_domain] |
| sdloc = | [this_dlocation] |
| sdlt = | MAINTENANCE_T |
| sdlm = | n/u |
| event = | RUL_M_ACK |

| | ALLOT_TS | |
|---|---|---|
| Name = | Allot one or more time slots from the time slot pool. | |
| Event = | ALLOT_TS | |
| Function = | Request the allocation of a time slot(s). | |
| Reason = | Generated by a port requiring a time slot. | |
| Direction = | PORT to LCB | |
| Checks = | None | |
| Possible responses = | ack_allot_ts or nak_allot_ts | |
| dclst = | [this_cluster] | |
| dhtype = | DIRECTED | The message is directed. |
| ddmn = | [this_domain] | |
| ddloc = | [[cb_dloc] | The dloc of the LCB determined at initialization |
| ddlt = | LCB_TIMESLOT_T | |
| ddlm = | n/u | Not used. |
| sclst = | a/r | Filled in by requestor as required. |
| sdmn = | a/r | Filled in by requestor as required. |
| sdloc = | a/r | Filled in by requestor as required. |
| sdlt = | a/r | Filled in by requestor as required. |
| sdlm = | a/r | Filled in by requestor as required. |
| event = | ALLOT_TS | |
| data[0] = | (# of time slots) | Num of time slots required, usually one. |
| data[1] = | ack_allot_ts | The ack event is supplied by requestor. |

-continued

| | ACK ALLOT_TS | |
|---|---|---|
| Name = | Acknowledge a time slot allot | |
| Event = | ack_allot_ts from the allot message | |
| Function = | Report success from an allocation | |
| Reason = | Response to an ALLOT_TS event. | |
| Direction = | LCB to PORT | |
| Possible responses = | None | |
| dclst = | sclst | |
| dhtype = | DIRECTED | The message is directed. |
| ddmn = | sdmn | |
| ddloc = | sdloc | |
| ddlt = | sdlt | |
| ddlm = | sdlm | |
| sclst = | [this_cluster] | |
| sdmn = | [this_domain] | |
| sdloc = | [this_location] | |
| sdlt = | LCB_TIMESLOT_T | |
| sdlm = | (the time slot number) | If # requested>1; then lowest time slots #. |
| event = | ack_allot_ts | As supplied by sender |
| data[0] = | (# of time slots) | Num of time slots required, usually one. |

| | NAK ALLOT_TS | |
|---|---|---|
| Name = | Negative acknowledge of a time slot allot | |
| Event = | nak_allot_ts - nak is the sender supplied ack_allot_ts +1 | |
| Function = | Report the failure of an allocation of a time slots. | |
| Reason = | Response to an ALLOT_TS event. | |
| Direction = | LCB to PORT | |
| Possible responses = | None | |
| dclst = | sclst | |
| dhtype = | DIRECTED | The message is directed. |
| ddmn = | sdmn | |
| ddloc = | sdloc | |
| ddlt = | sdlt | |
| ddlm = | sdlm | |
| sclst = | [this_cluster] | |
| sdmn = | [this_domain] | |
| sdloc = | [this_dlocation] | |
| sdlt = | LCB_TIMESLOT_T | |
| sdlm = | n/u | |
| event = | (ack_allot_ts +1) | Event supplied by sender +1 |
| data[0] = | (# of time slots) | Num of time slots required, usually one. |

| | FREE_TS | |
|---|---|---|
| Name = | Free one or more time slots and return to time slot pool. | |
| Event = | FREE_TS | |
| Function = | Request the de-allocation (freeing) of time slot(s) | |
| Reason = | Generated by a port needing to free a time slot. | |
| Direction = | PORT to LCB | |
| Checks = | Source must be owning dloc. | |
| Possible responses = | (a report( ) could be generated if the requestor does not own a time slot.) | |
| dclst = | [this_cluster] | |
| dhtype = | DIRECTED | The message is directed. |
| ddmn = | [this_domain] | |
| ddloc = | [lcb_dloc] | |
| ddlt = | LCB_TIMESLOT_T | |
| ddlm = | (the time slot) | The first (or only) time slot to free |
| sclst = | a/r | Filled in by requestor as required |
| sdmn = | a/r | Filled in by requestor as required |
| sdloc = | a/r | Filled in by requestor as required |
| sdlt = | a/r | Filled in by requestor as required |
| sdlm = | a/r | Filled in by requestor as required |
| event = | FREE_TS | |
| data[0] = | (# of time slots) | Num of time slots to free, will start at "the time slot" and free the next sequential "# of time slots". |
| NOTE: if data[0]= MY_TIMESLOTS | | All time slots ALLOT'ed to the sdloc will be freed. "the time slot" is unused. |

| | LISTEN_TO_TS | |
|---|---|---|
| Name = | Make a time slot listen to another | |
| Event = | LISTEN_TO_TS | |
| Function = | Request the LCB to make a one-way PCM connection via the TSI. | |
| Reason = | Generated by a port requiring a 64 kbit PCM connection. | |
| Direction = | PORT to LCB | |
| Checks = | Source must be the owner. | |
| Possible | A report( ) could be generated if the requestor does not own the | |

-continued

| | | |
|---|---|---|
| responses = | time slot and connection would not be made. | |
| dclst = | [this_cluster] | |
| dhtype = | DIRECTED | |
| ddmn = | [this_domain] | |
| ddloc = | [lcb_dloc] | |
| ddlt = | LCB_TIMESLOT_T | |
| ddlm = | (the listening time slot) | |
| sclst = | a/r | Filled in by requestor as required |
| sdmn = | a/r | Filled in by requestor as required |
| sdloc = | a/r | Filled in by requestor as required |
| sdlt = | a/r | Filled in by requestor as required |
| sdlm = | a/r | Filled in by requestor as required |
| event = | LISTEN_TO_TS | |
| data[0] = | (listen to dmn) | |
| data[1] = | (listen to time slot) | As supplied by ALLOT_TS |

READ_TS

| | | |
|---|---|---|
| Name = | Read and return the TSI connection memory and owner info | |
| Event = | READ_TS | |
| Function = | Request the LCB to return info on a particular time slot | |
| Reason = | Maintenance, debugging, etc. | |
| Direction = | Anyone to LCB | |
| Checks = | None | |
| Possible responses = | ack_read_ts | |
| dclst = | [this_cluster] | |
| dhtype = | DIRECTED | |
| ddmn = | [this_domain] | |
| ddloc = | [lcb_dloc] | |
| ddlt = | LCB_TIMESLOT_T | |
| ddlm = | (the time slot) | Info returned about this time slot |
| sclst = | a/r | Filled in by requestor as required |
| sdmn = | a/r | Filled in by requestor as required |
| sdloc = | a/r | Filled in by requestor as required |
| sdlt = | a/r | Filled in by requestor as required |
| sdlm = | a/r | Filled in by requestor as required |
| event = | READ_TS | |
| data[0] = | ack_read_ts | The senders event to return. |

ACK READ_TS

| | | |
|---|---|---|
| Name = | Info returned from the LCB in response to READ_TS event. | |
| Event = | ack_read_ts sent by requestor in READ_TS msg. | |
| Function = | To return info on a particular time slot | |
| Reason = | Maintenance, debugging, etc. | |
| Direction = | LCB to originator of READ_TS event. | |
| Possible responses= | None | |
| dclst = | sclst | |
| dhtype = | DIRECTED | The message is directed. |
| ddmn = | sdmn | |
| ddloc = | sdloc | |
| ddlt = | sdlt | |
| ddlm = | sdlm | |
| sclst = | [this_cluster] | |
| sdmn = | [this_domain] | |
| sdloc = | [this_dlocation] | |
| sdlt = | LCB_TIMESLOT_T | |
| sdlm = | (the time slot) | |
| event = | ack_read_ts | From READ_TS message. |
| data[0] = | (listen to dmn) | Read from the TSI connection memory |
| data[1] = | (listen to time slot #) | Read from the TSI connection memory |
| data[2] = | (owner dmn) | Domain from stored time slot data |
| data[3] = | (owner dloc) | Domain location from stored time slot data |
| data[4] = | (owner dlt) | Domain location task from stored time slot data |
| data[5] = | (owner dlm) | Domain location member from stored time slot data |

Utilizing the signalling message packets, a call connection may be established. The call set up is illustrated in FIGS. 8A and 8B which show the flow of a typical call both as to its signalling messages and to the establishment of the talking path. A call begins at (A) in FIG. 8A when a subscriber takes a phone off-hook. The phone is connected to a line circuit in a port board which detects the off-hook condition. Reference may be had to FIG. 4 for the details of the line circuit and its operation. The line circuit, as will be apparent from FIG. 4, has a processor which scans all of the lines (8 lines) to which it is connected. After detecting the off-hook condition of the subscriber line, the line circuit obtains a time slot on the DPH from the LCB in its domain. The line circuit communicates with the LCB using the DCL at its domain location. The microprocessor on the line circuit generates a packet requesting a time slot on its DCL link. This is the ALLOT-TS packet which indicates the requirement for a time slot. The LCB searches its data base to determine if a time slot is available. If a time slot is not available an ALLOT NAK response is sent to the line circuit (LN1). If a time slot is available, an ALLOT-ACK (with a time slot number) is sent to the requesting circuit (LN1).

Upon receipt of this ALLOT-ACK message, LN1 sends an off-hook message by broadcasting to the telephony processors (the MPBs). This is indicated on FIG. 8A as an address of (TP*, LN1). TP* indicates that a message is sent to each and every telephony processor (a broadcast). The message is sent on the DCL to LCB1. The LCB determines from the H bit that the message is to be broadcast to all domains. LCB1 checks its data base to determine if it has one (or possibly more) telephony processors (MPBs) in its domain. If an MPB is in the same domain as LCB1 the message is sent on the DCL connected to the MPB. Additionally, since the message is to be broadcast, LCB1 also sends the message on its DATS time slots over its IDH highway. The LCBs determine from the header of the incoming packet the destination of the packet. Since the packet is broadcast to all telephony processors, each LCB scans its data base to determine if it has a telephony processor in its domain. In the example shown in FIGS. 8A and 8B, the message is sent from LCB1 to LCB2. LCB2 determines that it has a telephony processor in its domain and that it should respond.

LCB2 sends a packet over a DCL in its domain to TP1 (the telephony processor in LCB2's domain). The telephony processor determines the next action in accordance with its program, which is to give dial tone and to collect digits. TP1 then sends a RECEIVE-DIGITS packet back to LCB2 with the destination of the originating line circuit (LN1). The packet makes its way back to LN1 via the IDH DATS. Then a LISTEN-TO dial tone request is sent to LCB1 which requests that LCB1 provide dial tone to the subscriber. Since a time slot has been allocated to LN1, when LCB1 receives the LISTEN-TO packet from LN1, it causes the time slot for dial tone to be connected to LN1, and LN1 listens to dial tone. After hearing the dial tone, the subscriber will begin to dial the phone. The digits are recorded by LN1, and when the quantity specified by TP1 have been received, they are sent to TP1 over the DCL-DATS network.

TP1 receives the digits and determines that LN1 is attempting to reach the subscriber that is attached to LN2. TP1 then sends a packet to LN2 with the instruction to ring line. In this example, LN2 is in the same domain as TP1, and therefore only LCB2 is involved in sending this packet. Also included in the packet is the time slot of the originating line (LN1's time slot). The originating time slot is recorded in LCB1 and 2 and is used to complete the talking paths. LN2, upon receiving the packet, attempts to obtain a time slot from LCB2. When the ALLOT-ACK message is received, LN2 performs the task of applying ringing current to the subscriber's phone and responds to TP1 with an acknowledge packet. TP1 receives the packet and responds back to LN1 with an acknowledge packet. When the acknowledge packet is received at LN1, LN1 requests LCB1 to cause LN1 to listen to ring back tone.

At this point (D) in FIG. 8B, the call has progressed to a stable ringing state. The call will stay in this state until the subscriber at LN1 either abandons the call or the subscriber at LN2 answers the call. In this case LN2 subscriber answers the call (after (D) in FIG. 8B) and generates an off-hook packet which is transmitted to TP1. Also a LISTEN-TO packet is sent to LCB2.

LCB2 receives the LISTEN-TO packet and causes LN2 to listen to the time slot of LN1. TP1, upon receiving the off-hook packet, sends an ANSWER packet to LN1. LN1 receives the packet and sends a LISTEN-TO packet to LCB1 which causes LN1 to listen to LN2. At point (E) in FIG. 8B, a two-way communication path has been established between LN1 and LN2 via the DPH and IDH highways.

After the conversation is completed, either subscriber hangs up and ends the call. This occurs just after point (E) in FIG. 8B. When the subscriber at LN1 hangs up, LN1 sends the ON-HOOK packet to TP1. LN1 also releases the time slot with a FREE-TS packet which is sent to LCB1. The packet directed to TP1 arrives and causes a RELEASE packet to be sent to LN2, which causes LN2 to free its time slot in LCB2. Sometime later the LN2 subscriber also hangs up and the call action is completed.

Referring to FIG. 7, there is shown in simplified form a diagram of the back plane board. This diagram schematically illustrates the positions for connectors 700 and 701 which are suitable for receiving the link controller board or any of the other devices which may be members of a domain. These are, as shown in FIG. 1, the link controller, port boards, telephony processors, service circuits, remote interface circuits and miscellaneous circuits. There are two positions for link controller boards shown in FIG. 7. The illustrated two LCB positions have the same connection to the inter-link cable (the IDH), the link identity bus, the intradomain PCM Highway (DPH), and all of the other leads, except for the self links to the DCL; thus, allowing for the use of redundant LCBs. Such a grouping of LCB positions is referred to as an LCB slip-group. In a presently preferred embodiment there are six such slip-groups, and the back plane and the shelf of boards which it interconnects may contain up to six domains. It will be appreciated that a shelf may contain only one domain.

Two positions 703 and 704 are shown for general purpose boards; these are domain members other than link controllers. General purpose boards include within their category gateway boards in the event that a domain is used for connection to a modular switching exchange of the type described in the above-referenced U.S. Pat. No. 4,228,536. It will be appreciated that many more general purpose connectors may be used and that the board extends either to the right or to the left as shown in the drawing with further general purpose board connectors in addition to the connectors 703 and 704.

A shelf includes several power supplies and ringing generators and power supply and ringing generator connector positions are available on the back plane. Two of these positions are shown at 702 and 705. The power supply and ringing generator positions receive power from a power input bus which extends the length of the back plane and is available to all power supply positions. This is a two-wire bus which is connected to the power mains by a plug or other suitable connector. The power supplies and ringing generators provide six output leads in a typical telephony exchange. These six leads run the length of the back plane. They may consist of a lead carrying the ringing current, a lead carrying 48 volt battery current, a ground lead, a +5 volt operating voltage lead, a −5 volt operating voltage line and a bias voltage ($V_{ss}$) lead. These leads are referred to as the power bus. The power bus is connected to the connectors at each of the link controller and general purpose board positions. When a power supply also serves as a ringing generator, it outputs a three-bit code on a ringing frequency control bus having three lines. This code changes as the frequency of the ringing current changes. The three-bit code identifies up to eight ringing current frequencies. A frame of cyclic ringing current frequencies may be used. The ringing frequency control bus is used in the port boards, and particularly the line circuits thereof as will be explained more fully hereinafter.

The DPH or PCM highway bus has 16 leads to cover two four-lead A and B receive (RCV) buses and two four-lead A and B transmit (XMT) buses. These buses A and B may be split into two groups and each group partitioned into three sections, each section serving a separate one of the six domains which may share the same shelf.

The clock and sync leads carry clock and sync pulses which are generated in the link controllers and transmitted along the entire back plane. In the event that an external clock and sync generator is used or in the event that a modular switching unit of a modular switching exchange which is part of the system provides clock and sync, the clock and sync leads may be chained, as mentioned above to insure that clock and sync is continually generated in spite of failures of any clock and sync source in the system.

Since there are 31 device communication transmit leads (DCLX) and 31 device communication receive leads (DCLR), the device communication link bus contains 62 leads. These leads are shared by all domains on the same back plane. Programming of the processors in each of the link controllers makes the link controller responsive only to members of its own domain. The power supply and ringing generator devices are assigned their own unique device communication links. If desired, RUL messages may continually check for failures in power supplies and ringing generators and may provide for switchover in event of failures. Also in cases where loads are heavy, more than one power supply may be connected to the power bus to share the load and provide for redundancy.

The link controller positions 700 and 701 (one slipgroup) are unique in that they are connected to interdomain input and output ribbon wire cable connectors 706 and 707. These connectors carry the link identification bus having the slip wires which go to the LCB positions 700 and 701. The connectors 706 and 707 also carry the IDH or interdomain PCM bus; this bus has 32 leads which provide 16 differentially driven pairs. Each LCB only uses one transmit pair and has 16 receive pairs, one from its own transmit pair and the other from the other 15 possible LCBs in the system.

The back plane may be a printed circuit board having multiple leads and connectors mounted on the boards for connection to these leads. The link controller and general purpose connectors may be on one side of the board while the power supply and ringing generator connectors may be on the opposite side of the board.

Referring to FIG. 2, there are shown the components of a link controller (LCB) and their interrelationships. The link controller is an intelligent device containing a link processor 200 which includes a microprocessor such as a Motorola type MC68010. The microprocessor is connected to a read-only memory (ROM) containing a multi-tasking program and a random access memory (RAM) having buffer space for the signalling messages. The link processor communicates with the device communication leads (DCLX and DCLR) via a communications interface 201 which is suitably an asynchronous communications interface adapter (ACIA) which may be of a type which is commercially available. There are 31 connections to the DCLX leads and 31 to the DCLR leads, and one connection each to the SLX and SLR leads. The self link leads are connected via the back plane to the DCL leads; thus designating the LCB position.

The signalling messages are handled by a control data interface 202 which receives the messages to be transmitted on the assigned DATS time slots of the IDH highway which is driven by this LCB. The DATS messages are inserted into the assigned DATS time slots by a time slot interchange system 203 which is connected to transmit call data and DATS messages on the IDH highway driven by this LCB. All of the IDH highways are connected to the time slot interchange 203. DATS messages from each of the highways are provided by the time slot interchange 203 to the control data interface 202 via an eight bit parallel data highway. The time slot interchange provides an interchange for the DATS signalling messages and also for the call data which is transmitted on and received from the intradomain highways (DPH) over four receive leads DPHR and four transmit leads DPHX. The 128 time slots which are available on the IDH are dynamically assigned to control data. At least one time slot, and up to eight time slots, may be assigned in each frame to signalling messages. These are the data time slots (DATS). Control of the time slot interchange is via time slot interchange control leads which provide pointers to connection memories in the time slot interchange 203. These leads (TSIC) from the link processor 200 effect connections between IDH time slots and the DPH and DATS channel (DC) time slots.

Clock and sync (DCK & SYNC) are derived by the time slot interchange, either from external clocks, the back plane clock and sync (which may have a clock chain), or from clock and sync which is embedded in the code on the interdomain highways. Clock and sync is connected to each of the components, although such connections are not shown in FIG. 2, to simplify the illustration. Clock and sync operate serial in, parallel out buffers (SIPO) on the receive side and parallel in, serial out buffers (PISO) on the transmit side of the DPH so that the DPH highways can run at a slower bit rate; 2.048 MHz rather than 8.192 MHz on the IDH highways.

The link identification bus (LIB) is connected to the link processor 200 so that the LCB can determine its domain number in accordance with the LIB bus protocol discussed above.

The LCB is shown in greater detail in FIG. 3. The link processor is made up of the microprocessor 300 with its watchdog timer 301, ROM 302 and RAM 303. The processor bus connects to the time slot interchange/PCM (TSI/PCM) controller 304 which is considered part of the link processor.

The control data interface which handles the signalling or DATS messages is provided by a DATS controller 305, receive and send DATS buffer memories 306 and 307 and a dual direct memory access (DMA) processor 308.

The time slot interchange system includes a clock source selection, clock and sync generation and clock chain control circuit 309 which can derive clock from an external clock, from the back plane clock and sync, which may have a clock chain, or from the clock and sync signals which are embedded in the code received on the IDH highways. The clock chain lead to the circuit 309 signals the circuit when to supply the clock and sync leads on the back plane. The time slot interchange has data decoders which are connected to the receive sides of the IDH highways. These are shown in FIG. 3 as the link 0 decode circuit through the link 15 decode circuit 310. The illustrated LCB transmits on IDH highway 0 and receives from all of the IDH highways. The data is transmitted in PCM code, suitably Manchester encoded. This is a self-clocking code such that clock can be derived at each bit time. Sync is transmitted as an encoding anomaly every 128 time slots (each time slot containing a byte of eight serial bits). Thus every 128×8 bits, sync is detected, for example as a code violation (absence of a clock edge).

The time slot interchange receives the decoded data, including clock and sync, in a connection memory of 16 separate elastic stores 311. These stores are shift registers which are long enough to contain a plurality, suitably four frames of data; the last received and three prior frames. The elastic stores are connected under control of the TSI/PCM controller 304 to a transmit PCM parallel in serial out register (XMT PCM PISO) 312. The serial data received is transmitted on the DPH intradomain highways by a selector switch (XMT PCM select) 314 which drives selected ones of the eight transmit DPH highways. Only one group of highways, either bus A or bus B will be used in a domain. Facilities for two groups of DPH highways which can be partitioned into three sections each, enables up to six domains to be located on the same shelf interconnected through the same back plane, as discussed in connection with FIG. 7.

On the receive side, the receive DPH highways selected from either bus A or bus B by the receive PCM select switch (RCV PCM select) 315 are connected to the appropriate time slots on the IDH highway (XMT IDH 0), through a serial in, parallel out buffer (RCV PCM SIPO) 316 and a transmit link encoding circuit (XMT link encode) 317. The encoding circuit 317 translates the parallel data into serial form, encodes it into Manchester code, with the code violation when the end of frame occurs to encode sync, and provides serial groups of eight bits on the IDH highway (IDH 0) at the 8.192 MHz bit rate.

Signalling messages from the DATS buffer are similarly encoded in the transmit link encoder 317 and transmitted in the DATS time slots over XMT IDH 0.

DATS messages from the receive buffer are transferred into RAM on command from the microprocessor 300 which operates the DATS control 305. DATS messages are placed in a queue, accessed by the DMA processor 308 and transmitted out over the communications interface, which is a 32 channel ACIA 318, when directed to a selected device communication link. Signalling messages are also received over the device communication link receive leads (DCLRs), transferred to RAM and there operated on. For example, when the signalling message is an ALLOT-TIME SLOT, it is dispatched, either addressed to a designated device in a designated domain or broadcast, to the send DATs buffer memory 307 and transmitted in the DATS time slot by the XMT link encoder 317.

Link identification is obtained through a link ID access circuit 319 which transfers the link identification code to the processor bus. The processor stores its link identification in RAM for use in signalling message formatting and processing of received signalling messages to determine if they are addressed to the domain of the LCB.

More particularly, in the link decode circuits 310, the clock is decoded by the use of a phase locked loop circuit which is synchronized by the edges of the pulses which designate each bit. Sync is detected by comparing the clock generated using the phase locked loop with the raw data from the receive links. If the clock edge is omitted (the coding violation) as occurs each 128×8 bit bytes, or each 125 microseconds, an output pulse on the sync lead is obtained. The sync and clock pulses are used to decode the PCM data from the highways and enter the data into the elastic stores 311.

Where clock and sync is to be derived from the IDH highways, the lowest number LCB (for domain 0) may be used by setting a register which controls the clock and sync selection circuit 309. The clock is monitored in the circuit 309. A missing clock pulse detector generates an interrupt to a switchover routine which then selects clock from another IDH in predetermined order.

The data is stored in the elastic stores 311 clocked in by the clock and sync on the IDH highways. Since four frames of data are stored in the elastic stores which provide the connection memory, transfer of data to the DATS BUFFER memories 306 and 307 and the DPH need not occur synchronously with the data on the IDH highways. It is a feature of the system, therefore, that it is not affected by varying delays in transmission depending upon interdomain cable lengths.

The read side of the elastic stores 311 is connected one at a time under control of the TSI/PCM controller 304 to the intradomain (DPH) highways via the switched PCM bus, the XMT PCM PISO 312, and the XMT PCM select circuit 314. The clock and sync pulses generated in the clock source select, clock sync generation and clock chain control circuit 309 control the read out from the elastic stores. Therefore, the read out is synchronous although the input to the elastic stores may be asynchronous. The TSI controller 304 controls which of the elastic stores 311 and which location in that store is read out. There are 128 time slots from each of the 16 highways available. 128 of these time slots are switched during each intradomain (DPH) highway frame. Accordingly, a change in bit rate on the highways occurs during de-multiplexing and the transfer of data from the connection memory to the DPH highways.

When eight time slots per frame are allotted on each IDH highway for DATS information, there are available 128 bytes of DATS information which may be selected and written into the receive DATS buffer memory 306. It will be appreciated that there is a total number of 2048 time slots (16 times 128) available from the interdomain highways per frame. In effect, therefore, there are two time slot interchanges. One for call data (voice and data messages which go on the domain PCM (DPH) highways) and one for signalling messages which are communicated on the DCL/DATS network. The system operates by reading out DATS time slots and call data time slots alternately into the receive DATS buffer memory 306 and into the transmit PCM PISO 312.

There are DATS messages in at least one, but up to eight, predetermined time slots in each frame of data stored in the elastic stores 311. The DATS control circuitry 305 includes counters which obtain timing information from clock and sync through the TSI/PCM controller 304. When a DATS byte appears on the switched PCM bus, the DATS control 305 reads the DATS byte into the receive DATS buffer memory 306. When all of the bytes of a DATS buffer (up to 32 DTS bytes) which constitutes all or part of a signalling message which is carried on the DATS/DCL communication network have been received and stored in the receive DATS buffer memory 306, the channel number (on the IDH) which is the source of the DATS buffer is provided by the DATS control 305 via the processor bus to the microprocessor 300. A DMA (direct memory access) processor in the dual DMA processor 308 is then signalled and makes the processor bus available for the DATS buffer. The DATS control 305 then reads the DATS buffer from the receive DATS buffer memory 306 onto the processor bus. In effect the DMA processor 308 moves DATS buffers between the receive DATS buffer memory 306 and RAM 303 so as to provide highest priority to handling of DATS messages. If the DATS message is not for this LCB, then the area in RAM is made available for the next DATS message. The read only memory 302 includes a message dispatcher program which queues the messages into the DCLs.

Commands to the TSI/PCM controller 304 are issued by the microprocessor 300, in response to signalling messages; the source of which may be the DATS time slots or the DCLs in the domain. In the event that a signalling message appears on a DCL, it enters the LCB via the ACIA 318. The presence of a byte of a signalling message on a DCL provides an interrupt. The DCL/DATS message is the transferred to the same buffer section in RAM 303 as the signalling messages from the receive DATS buffer memory 306. In the event that a diagnostic capability is required, a diagnostic terminal may provide diagnostic messages from the ACIA onto the processor bus.

In order to send DATS messages over the IDH, the processor 300 commands the DMA processor 308 to transfer the DATS message in RAM 303 into the send DATS buffer memory 307. The TSI controller 304 counts time slots in a frame, and when the DATS time slots occur, data is read from the send DATS buffer memory 307 into the transmit link encoder 317 and transmitted out in the DATs time slots. PCM data from the DPH highways is multiplexed with the DATS data and transmitted on the IDH highway.

There are 32×4 (128) time slots on the DPH highways. These are stacked and transmitted in parallel to four shift registers in the receive RCV PCM SIPO 316. There is dynamic time slot assignment from the TSI/PCM controller 304 which transfers the PCM bytes to their assigned time slots. On the transmit side, the time slot controller 304 reads the parallel PCM bytes from the elastic stores 311 at the selected time slots onto the switched PCM bus. The processor 300 assigns the time slots by writing time slot assignments into the TSI/PCM controller 304, which contains RAM for this purpose. The transmit (XMT) PCM PISO 312 converts the call data on the switched PCM bus from parallel to serial for transmission to the DPH highway via the transmit (XMT) PCM select circuit 314. There is a map in RAM 303 for time slot assignment. When a time slot is assigned it is marked busy in the map. Therefore, time slots can readily be allocated to the circuits in the port boards.

In summary, the TSI controller 304 indexes into the elastic stores and switches via the transmit PCM PISO 312 at the desired one of the 128 time slots thereby making connections as required. The processor 300 operates with the dual DMA processor 308 which transfers data with respect to the RAM 303 from the receive RCV DATS buffer memory 306 and to the send XMT DATS buffer memory 307.

The watchdog timer 301 is a hardware supervisor. A specific code must be written into the timer 301 within a set period of time. If not, the watchdog timer times out and resets the processor. Also, upon time out, the watchdog 301 flashes an alarm, either audibly or visually, as on an LED, and starts another timer which operates a major alarm relay. If there is a watchdog time out (indicative of a major processor failure) the initialization routine is reinitiated.

Most of the connection signalling messages, as pointed out in the discussion of FIGS. 8A and 8B are generated in the telephony processor and are conveyed to the devices via the DATS/DCL communications network.

On initialization, the LCB generates and transmits the RUTH messages to each domain location as well as to itself on its self-link. These messages are acknowledged from destination locations with data which indicates what type of device is connected to each DCL.

Referring to FIG. 4 there is shown a block diagram of a line card. In the illustrated line card, there are shown eight line circuits. The power and ringing leads connect into the line card from the back plane as was discussed in connection with FIG. 7. The ring control leads on the back plane are entered into a read only ring control register 400 which is monitored from and read into the processor bus of a microprocessor 401 which controls the line card. The microprocessor 401 uses read only memory (ROM) 403 and a random access or RAM memory 404. These memories are connected to the processor bus. The microprocessor 401 has a watchdog timer 402 which operates in a manner similar to the watchdog on the LCB and which monitors the processor bus for a message to indicate that the microprocessor 401 is operating properly. In the event of a failure, reset and reinitialization is attempted, and alarms are set if a permanent failure arises.

The A&B DPH buses of eight leads each from the back plane connect to the line card. These buses are indicated as the ADPHX and BDPHX buses, which transmit PCM data into the line card, and the ADPHR and BDPHR buses, which receive PCM data from the line card. These buses are connected to a highway selector circuit 405 which can select two highways. The highways which are elected may be different ones of the eight transmit and eight receive highways. The selection is controlled by the highway select register 406 under microprocessor control via the processor bus.

The ACIA 407 interfaces with the DCLX lead and converts the serial signalling messages into parallel data on the processor bus. When a byte of a signalling message is received, the ACIA 407 issues an interrupt which is detected by the microprocessor. After receiving the interrupt, the microprocessor 401 addresses the ACIA 407 which transmits the data to the microprocessor 401 via the data lines of the processor bus.

To send signalling messages to the LCB, the ACIA 407 converts the parallel data on the processor bus to serial data and transmits the serial data to the DCLR lead. When a byte of the signalling message is transmitted, the ACIA 407 issues an interrupt, which is detected by the microprocessor 401. After receiving the interrupt, the microprocessor 401 addresses the ACIA 407 and provides it with another byte for transmission.

The line card controller (LCC) 408 receives the clock and sync from the back plane and uses them to sequence the time slots. The eight line circuits need only 16 time slots, each operating at the 64K bps rate for the widest bandwidth service which is contemplated. The principal function of the controller 408 is to select up to 16 time slots in the two highways which are selected by the highway selector 405, either for the transmission or reception of PCM (call) data to or from the line interface units 409. These units may also be referred to as subscriber loop interfaces, since they connect to the tip and ring leads of the lines which are served by the line card. The line card controller 408 effects dynamic time slot assignment under control of the microprocessor 401. In response to the signalling messages from the microprocessor 401, the line card controller 408 presents the appropriate time slots to Codecs which are combined with line control circuits 410 in each of the line interfaces 409. It will be appreciated that the line interfaces 409 are identical and each receives battery and ground and ringing current by connection to the power and ringing leads on the back plane. Only the connections to the line 0 interface are shown to simplify the illustration. The line card controller 408 also sends the data from the Codecs out on the selected highways of the DPH. The line interfaces 409 and the line card controller 408 may use or be integrated circuits of a type which is commercially available. The line card controller may be the type 2952 integrated line card controller which is sold by Intel Corporation of Santa Clara, Calif., U.S. The Codecs may be type 29C50/29C51 devices also sold by Intel.

The unit 410 provides parallel input and output ports to the line interface 409 and can drive relays in the ringing relay and reverse battery relay unit 411. The Codec and line control unit 410 also connects to a subscriber line interface (SLIC) 412 which contains the two to four wire hybrid for the subscriber loop. It detects loop resistance for off-hook and on-hook conditions and includes a ring trip circuit, for example of the type described in U.S. Pat. No. 4,524,245 issued to Bruce Littlefield. Off and on-hook conditions are detected by the presence or absence of current in the loop.

The Codec in the unit 410 contains the digital to analog and analog to digital converter circuits. These circuits are provided with gain control to accommodate transmission loss. The control byte from the LCC 408 is provided to the Codec via the LCC bus, for gain control. The control byte to the Codec 410 also provides commands for connecting the ringing current lead to the tip and ring leads at the appropriate time. The ringing relay supplies ringing current from the ringing lead when the ringing relay is operated. This is done when ringing is required during the time that the appropriate ringing current frequency is on the ringing current lead as indicated by the ring control code. The relay control signal also operates the reverse battery relays so as to provide supervision for party line divided ringing. The tip and ring leads are connected through a conventional line protection circuit or device 413, such as a varistor, which protects the system against high voltage transients, such as lightning which may strike the line.

The LCC 408 is connected to the unit 410 via the LCC bus which has a clock lead, direction lead, and a data lead. During one-half of the cycle on the direction lead, the LCC 408 provides data via the data lead to the units 410. On the other half of the direction cycle the Codecs provide data to the LCC 408 via the data lead. There are a certain number of clocks per direction cycle. There may be 32 clocks in each direction to accommodate four bytes. The first two bytes carry call data. The third byte is for Codec control, such as gain adjustment. The fourth byte is another control byte. The control bytes are generated and received by the LCC 408 under control of the microprocessor 401. The LCC 408 has registers which contain the data.

Control information contained in the control bytes includes a bit which indicates that the SLIC 412 has detected an off-hook condition. When a Codec is to send, it sends two bytes of PCM data, and then a control byte, one bit of which is dedicated to the loop condition (on/off hook). The control information is presented by the LCC 408 on the data bus to the microprocessor 401 in an address space of the microprocessor (an input/output window). The microprocessor 401 then can generate the ALLOT-TS packet, when an off-hook condition is detected. This packet is transmitted byte by byte by the ACIA 407 on the DCLR to the LCB. The ALLOT-TS-ACK packet is then received over the DCLX via the ACIA 407 by the processor 401 and the requisite control message to the LCC 408 enables connections to be made during the allotted time slot when it occurs.

For tones, there may be allotted certain fixed time slots for each different type of tone. This simplifies the selection, since the LISTEN-TO message may be automatically set up without intervention of the telephony processor. All of the other signalling functions, such as receive digits are handled similarly through the SLIC 412, the control bytes from the unit 410 and the LCC 408. The digits are stored in RAM 404 and transmitted to the telephony processor over the DCL/DATS communications network.

All of the telephony functions and the means for generating the port process signalling messages are, therefore, available in the line card. The line card and the other members of the domain together with the telephony processor and the LCBs are capable of providing the connections between various subscribers connected to the system.

Referring next to FIG. 5 there is shown the switching system provided by the invention as applied to expand the size of a modular switching exchange or MSX system of the type described in U.S. Pat. No. 4,228,536. The system as shown in FIG. 5 is capable of integrating up to 32 MSX systems. In this configuration, each MSX system is called a stack and can have up to seven modular switching units (MSUs). Each stack can contain about 336 lines, and, therefore a fully configured expanded system can contain about 10,000 lines and provide connections therebetween. The MSUs are interconnected by inter-MSU-PCM highways and by inter-MSU control lines including identification, timing and a serial control signal data link. Each MSU can handle a maximum of 64 time slots in normal operation. However, considering lines available for service circuits, trunks, etc., approximately 48 time slots per MSU are available.

In the system illustrated in FIG. 5 an MSX gateway board (MGB) 500 is provided instead of one of the MSUs. This MSU gateway board 500 provides access for the MSX to the LCB of the domain via the DPH highways. The MGB 500 has access to the MSU control leads, including the serial link, and thereby can receive and send inter-MSU processor messages. The MGBs can cause these messages to be transmitted over the DCL as signalling messages. Each MGB provides a 64 time slot gateway between a domain and an MSX. Therefore, two stacks can be handled in each domain via two gateway boards. Thus, a full system of 16 domains can handle 32 MSU stacks which contain approximately 10,000 lines, and provide connections between any of these lines. This system unifies and integrates the MSUs into a medium size switching system of approximately 10,000 lines. Of course all of the stacks need not be used. Instead of two gateway boards and two stacks, the domain may include a complement of port boards, telephony processors, service boards and other boards as described in connection with FIG. 1. Thus, different types of service can be afforded to suit the application. A principal feature of the system is its flexibility in this regard.

Another feature of the system is ease of administration. Any one of the, domains may include a telephony processor board (MCB) and/or a mass storage board (MSB) for administrative functions such as changing the data base, changing line numbers, station numbers and addition and deletion of trunks. The MPB can communicate with the MSUs via an MGB and the DCL DATS communication network. The highways between the mass storage board (MSB) and the MCB can facilitate uploading and downloading of files into the MSU stacks by transferring data between the MSB and the MCB. A typical service which can be provided to facilitate administration is the transfer of "help" files, allowing such files to be accessed via the time slots on the IDH/DPH highways by the MCB board, and may be displayed on terminals.

It is preferable to dedicate half of the available time slots to one of the gateway boards in the domain (e.g., MGB-0) and the remaining available half to the other gateway board (e.g., MGB-1).

The telephony and call processing functions are handled in the MSUs in accordance with their signalling protocol, wherein each MSU has a processor and inter-processor messages (IPMs) are transferred over the serial link in the MSU control lines. The IPM is the serial link message in the MSU. These messages are conveyed between MSX stacks by embedding them in packets which are formatted in the gateway boards The IPM is inside of a packet with a header for controlling the transfer of messages between domains The packet data travels along the DCL-DATS communication network as was discussed in connection with FIG. 1. The packet is shown in the table presented below together with the definitions of the fields (data bytes) in the packet.

| bits - | f,e,d,c,b,a,9,8,7,6,5,4,3,2,1,0 | word | bytes | |
|---|---|---|---|---|
| | link pointer | 0 | 0,1 | |
| | | 1 | 2,3 | |
| | count / event | 2 | 4,5 | |
| | dCLST /*/ dDMN / dDLOC | 3 | 6,7 | *dhtype |
| | dDLT / dDLM | 4 | 8,9 | |
| | sCLST /*/ sDMN / sDLOC | 5 | A,B | *n/u |
| | sDLT / sDLM | 6 | C,D | |
| ** - | length / dSTK/MSU | 7 | E,F | ** - MSU buffer start |
| | dJOB / sSTK/MSU | 8 | 10,11 | |
| | sJOB / MDX event | 9 | 12,13 | |
| | sPORTNO / data[0]/dpn | A | 14,15 | |
| | data[1] / data[2] | B | 16,17 | |
| ** - | data[3] / data[4] | C | 18,19 | ** - start of 2nd MSU buffer |
| | data[5] / data[6] | D | 1A,1B | |
| | data[7] / data[8] | E | 1C,1D | |
| | data[9] / data[10] | F | 1E,1F | |
| | data[11] / data[11] | 10 | 20,21 | |

All packets contain the following fields:
link pointer—A pointer to the next buffer; for message integrity internally generated and not included in packet transmitted over DAT/DCL network.
count—M2 buffer byte count; includes all bytes from count to end
event—The M2 event, uniquely defined for each task.
dCLST—The destination cluster, optional.
dDMN—The destination domain.
dDLOC—The destination Domain Location.
dhtype—The packet header type, broadcast or directed.
sDLT—The Source Domain Location Task.
sDLM—The Source Domain Location Member.
sCLST—The Source cluster, optional.
sDMN—The Source domain.
sDLOC—The Source Domain Location.
shtype—Optional.
sDLT—The Source Domain Location Task.
sDLM—The Source Domain Location Member.
When transporting an MSU buffer, the packets contain the following additional fields:
mlength—The MSU IPM data length. (The number of bytes carred as data.)
dSTK/MSU—The MSU Destination stack and MSU number.
dJOB—The MSU Destination JOB.
sSTK/MSU—The MSU Source Stack and MSU.
sJOB—The MSU Source Job.
MSU event—The MSU Event.
sPORTNO—The MSU Source Port Number.
dpn—The destination Port Number, if included.
data[—]—The data carried within an MSU IPM.
n/u—Not used.

The gateway boards are modular and a typical MGB is illustrated in FIG. 6.

A number of level shift buffer circuits 600 are used where the level of the digital signals in the domains is different from that established in the MSUs. These circuits include buffer amplifiers for level shifting purposes. In particular the MSUs may use a negative voltage supply while the domains may use a positive voltage supply. These levels must be shifted and the signals in the MSUs and domains buffered with respect to each other.

The same 32 lead cable which carries the MSU PCM highways is connected to a time slot interchange and elastic store unit 605 in the MGB. The MSU identification bus for MSU identification also enters the MGB. The control leads, including the clock chain in (CHIN) and the clock chain out (CHOUT) leads, which travel in daisy chain fashion between the MSUs, are also part of the MSU control leads which enter the MGB. The other control leads are the clock and sync leads, the serial link (MLINK) and the link busy (MBUSY) leads. On the domain side the MGB is connected to the A and B DPH send and receive highways, a DCL, the domain clock and sync leads, and, when required, the domain clock chain control leads. Highway selector switches 601 controlled by the microprocessor 602 in the MGB select either the A or B DPH highway buses.

The microprocessor 602 accesses RAM 612 and ROM 613 via the address, data, and control leads to execute software programs which control the functioning of the MGB. The address, data, and control leads are further connected to the time slot interchange and elastic store 605, the serial data interface 606, and the I/O control 611, allowing the microprocessor 602 to control these circuits.

The MGB has a clock check and control unit 603 which may be used to provide master clock and sync to the LCB from the MSX stack or may provide master clock and sync for the MSX stack from the domain; for example from an IDH highway via the LCB. The clock check and control unit 603 monitors the domain clock and the MSU clock and allows software (in RAM 612 or ROM 613) tasks in the processor 602 to monitor the condition of both clocks to control clock switchover via the input/output control unit 611. Either clock could be used first. If the software detects neither domain nor MSX stack clock for a short time (e.g., three milliseconds), both clocks will be allowed to operate asynchronously. The microprocessor 602 sets up the paths (interconnects time slots) in the time slot interchange 605. The time slot interchange and elastic store 605 is a 512 by 128 time slot interchange. Four 32 time slot highways are indicated. These may be used alternately since preferably only 64 time slots are utilized by the MGB. However, if the system requires, all 128 time slots may be dedicated to one MSX stack via the MGB.

To accommodate delays in clocks, the elastic store in the time slot interchange 605 stores two frames of data. A synchronizing circuit 607, controlled by the domain clock insures that the outputs to the DPH from the TSI and elastic store 605 operate synchronously with the domain clock. The unit 605 is operated by a frame slip control unit 608. This unit 608 monitors the sync signals from both the domain and the MSX stack and provides for addition (duplication) or deletion of frames to allow for asynchronous operation of the MSX stack in relation to the domain.

The clock which controls the timing of data on the MSU PCM highways is the MSU clock from the MSU clock and sync leads. When data from the DPH highways arrives it is inputted into the PCM elastic store 609 which stores two frames of data. A synchronizing and retiming circuit 610 similar to the circuit 607 is controlled by the MSU clock and insures that the TSI function operates at the MSU clock rate and synchronously with the MSU clock. Thus, the operation of the MGB with respect to the LCB and the interdomain highways can be asynchronous and not affected by delays in the MSU stack and vice versa.

The MGB is connected to one of the device communications links via a unique DCLX and DLCR pair through a link interface 604 and serial data interface 606. Another link interface 614 between the serial data interface 606 and a test access serial link may be used for maintenance access.

The processor 602 assembles the IPMs from its MSX stack into packets for transmission over the DCL/DATS network, including the appropriate IPM data and header information. The addresses enable the packets to be sent to any one of the 7×32 (224) MSUs in the system. A link arbitrator 615 controls the transmission of signalling messages on the MSU serial link. The message which is transmitted is the MSU buffer portion of the packet data as previously described. Because of the packet's destination information, the MSU can determine if a message is directed to it by checking its own data base which is contained in the memory of the MSU processor. This way a line connected to a designated MSU may be seized and rung and paths established through the time slot interchanges in the MSUs, the time slot interchange 605 in the MGB and the time slot interchanges in the LCBs. Each connection between two MSU lines uses multiple time slot interchanges (up to six time slot interchanes in all) to set up the path.

The modular switching system provided by the invention is very flexible in terms of the complements of devices which may be used. It can be configured to increase the capacity of MSX switching systems or to provide various types of connections to lines or other devices and to afford a wide variety of services for both voice and digital telecommunications. Signalling is separated from call message communication and is provided on a per device basis within the domain to increase the flexibility and reliability of each domain. Between domains, the signalling and call data communications share the transmission facility to reduce overhead and increase the flexibility and reliability of the system. Reliability is also enhanced by the use of modular components and the facility for the use of redundant processors for call processing.

Variations and modifications in the herein described systems, within the scope of the invention, will undoubtedly suggest themselves to those skilled in the art. Accordingly the foregoing description should be taken as illustrative and not in a limiting sense.

We claim:

1. A TDM telephone switching system for extending paths between a multiplicity of ports, including ports adapted to be connected to telephone lines or trunks, which are located in a multiplicity of domains, said system comprising: at least one telephony processor having means for generating messages for controlling the establishment of said paths including ringing of lines, collection of digits, identifying called lines, application of tones including dial tones, ringing tones and ring-back tones; means defining a plurality of interdomain highways (IDH) for transmission of digital signals, each of said domains being connected in signal transmitting relationship with a different one of said plurality of said IDH and in signal receiving relationship with all of said plurality of said IDH including the one of said plurality of said IDH to which it is connected in signal transmitting relationship; link control means in each of said domains having time slot interchange means for establishing cyclical series of time slots for digital signals on the one of said plurality of IDH connected in signal receiving relationship therewith; at least one intradomain highway for PCM signals (DPH) also connected to said link control means; said link control means also having means for establishing cyclical series of time slots for said PCM signals on said DPH; a plurality of communications links for data message signals in each of said domains (DCL), said plurality of said DCL being connected to said link control means; said time slot interchange means including means for assigning time slots in each of said series of time slots for said digital signals, for said data message signals and for said PCM signals to interconnect said IDH and said DPH in selected time slots in each series and also to interconnect said IDH and said DCL in other selected time slots in each series; a plurality of devices in each of said domains including circuits for interfacing a different group of said ports with circuits connected to said telephone lines or trunks, each of said devices being connected to a different one of said communications link and to said PCM highway in the domain thereof; said telephony processor being disposed in at least one of said domains and being connected to the one of said communications links in said one domain which is unique thereto; and means in said devices for generating and receiving data message signals of different types depending upon the events occurring at said ports and for generating and receiving PCM signals in selected ones of said time slots on said DPH, said data message signals between said devices and said telephony processor for establishing said paths during selected time slots between said circuits connected to said ports being communicated via said DCL, said link control means in said domains and said IDH.

2. The system according to Claim 1 further comprising means in each of said link control means for allotting time slots in each of said series in response to said data messages from said devices received over said DCL.

3. The system according to claim 1 wherein each of said link control means has means for generating data messages acknowledging received data messages and directing said acknowledging data messages to the device which is the source hereof along the one of said plurality of said DCL unique to that source device.

4. The system according to claim 1 further comprising a link identifying bus (LIB) connected to each link control means and having means presenting a unique code to the link control means connected thereto, means in said link control means responsive to the identity code presented thereto and to the connections via the unique ones of said plurality of said DCL for assigning codes identifying the domain in which each said link control means is disposed and the locations in each of said domains of each of said devices.

5. The system according to claim 4 wherein said means in said devices and in each of said link control means for generating said data messages include means for including those of said domain and location codes identifying both the source and the destination in each of said data messages.

6. The system according to claim 5 wherein said means for generating said data messages further comprises means for including direction codes identifying whether said messages are for devices in a unique one of said domains or in all of said domains, and means in said link control means responsive to said direction code for broadcasting said data message over at least one of said digital time slots in said cyclical series of digital time slots on said IDH assigned to data messages to all of said domains.

7. The system according to claim 5 wherein said means for generating said data messages includes therein means for generating a code uniquely identifying the event which that data message is signalling.

8. The system according to claim 7 wherein said data message generating means includes means for generating said data messages in successive fields each including at least one byte, the first of said fields being a flag to designate that the message contains new data, the second of said fields being a byte representing the number of bytes in the message, and the others of said bytes representing destination and source locations for the message, the event represented by the message, and the data corresponding to the event.

9. The system according to claim 1 wherein said link control means each includes means for encoding said digital signals sent on the one of said plurality of IDH in signal transmitting relationship with the domain of said link control means with clock and sync information, and means responsive to the clock and sync information from a selected one of said interdomain highways which is in transmitting relationship with the domain of said link control means for generating clock and sync pulses for said domain.

10. The system according to claim 9 wherein said time slot interchange means of each of said link control means includes connection memory means for storing a plurality of series of said cyclical series of digital signals from each of said IDH, memory means for said data message signals, and means controlled by said clock and sync pulses separately providing connections from said connection memory to said DPH and from said connection memory to said data message memory means, and means for transferring said data messages from said data message memory means to selected ones of said DCL.

11. The system according to claim 10 wherein said time slot interchange means of each of said link control means further comprises means responsive to said clock and sync signals and said data messages for transmitting said PCM signals in selected time slots on the one of said IDH connected in receiving relationship with the domain having said link control means therein, means for storing data message signals received by said link control means from said plurality of said DCL of its domain, and means also responsive to said clock and sync signals for transmitting said data message signals in the time slots assigned thereto in each of said series of time slots on the interdomain highway in receiving relationship with said link control means of said domain.

12. The system according to claim 1 where said link control means further comprises programmed processor means responsive to said data messages and connected to said time slot interchange means, said data message memory means and said DCL for controlling the allotting of said time slots on said highways and operating said interchange means.

13. The system according to claim 12 wherein each of said devices also includes programmed processor means for generating said data messages and for controlling events in response to data messages received on the one of said communications links connected thereto.

14. The system according to claim 13 wherein the ones of said devices which contain a plurality of said ports (port devices) each comprises a plurality of line interface means each connected to a different telephone line circuit, each of said line interface means including Codec and line control means for detecting conditions at said line circuits, translating voice signals into PCM signals and vice-versa and applying ringing signals to said line circuits, controller means for selectively connecting said DPH to said interface means, said controller means also being connected to the programmed processor of said port devices for controlling said interface means in response to the ones of said data messages directed to said port devices and for generating said data messages in response to said conditions which are detected by said interface means.

15. The system according to claim 1 further comprising a stack of modular switching units and gateway means connected to said modular switching units in at least one of said domains, said gateway means being connected to said link control means in said one domain.

16. The system according to claim 15 wherein said telephony processor is provided in at least of one of said modular switching units.

17. The system according to claim 15 wherein said gateway means is connected to said link control means via said DPH and one of said DCLs of said one domain.

18. The method of time division multiplex switching to establish connections between ports, which originate and receive PCM or otherwise digitally coded call data, and other devices or ports in a communications network arranged with the ports and other devices in different ones of a plurality of domains which comprises the steps of:
   defining a first plurality of cyclical series of time slots for digital signals running concurrently along a plurality of independent unidirectional interdomain highways equal in number to the number of said domains in said plurality of domains and interconnecting said domains;
   generating second pluralities of cyclical series of time slots for said call data along a plurality of independent bidirectional intradomain highways interconnecting said ports and other devices in each of said plurality of domains, the time slots of each series of said second pluralities corresponding to different time slots of each series of said first plurality;
   generating signalling messages respecting events for establishing said connections along communication links separate from said intradomain highways which extend along each of said domains;
   assigning said signalling messages to at least one time slot of each series of each of said first plurality;
   allotting with said signalling messages time slots, other than those assigned to said signalling messages in said first plurality, in said first and second pluralities of time slots for the communication of said call data between said ports; and
   making in response to said signalling messages interchanges between said first and second pluralities of time slots and connections between said ports in said allotted time slots.

19. The system according to claim 18 wherein at least one of said plurality of domains has a stack of modular switching units (MSUs) which originate and receive said PCM or otherwise digitally coded call data along inter-MSU highways and signalling messages along at least one control line, and further comprising sending and receiving said inter-MSU highway call data on at least one of said second pluralities of time slots of the one of said plurality of intradomain highways of the one of said domains having said MSU stack, and sending and receiving said signalling messages on said control line along one of said communication links of the one of said domains having said MSU stack.

20. A time division multiplex switching system which establishes connections between ports which originate and receive PCM or otherwise digitally coded call data and other devices or ports in a communications network which comprises:
   means for connecting said ports and other devices in a plurality of domains;
   means for defining first pluralities of cyclical series of time slots for digital signals running concurrently on a first plurality of unidirectional and parallel interdomain highways equal in number to the number of domains in said plurality of domains and connected to each of said domains;
   means for generating second pluralities of cyclical series of time slots for said call data on a second plurality of bi-directional and parallel intradomain highways, the time slots of each series of said second pluralities corresponding to different time slots of each series of said first plurality;
   means having connections to said ports and other devices for generating signalling messages respecting events for establishing interchanges between said first and second pluralities of time slots and providing said connections;
   communications links in each of said domains separate from said second plurality of highways thereof interconnecting said ports and other devices for carrying said signalling messages bi-directionally in each of said domains;
   means for assigning said signalling messages to at least one time slot in each series of said first pluralities of time slots;
   means for allotting with said signalling messages time slots other than those assigned to said signalling messages in said first plurality, in said first and second pluralities of time slots for the communication of said call data between said ports and devices; and
   means responsive to said signalling messages for providing said interchanges between said first and second pluralities of time slots and making said connections between said ports in said allotted time slots.

21. The system according to claim 19 further comprising a plurality of devices including at least one telephony processor disposed in different ones of said domains, link control means in each of said domains providing said time slot defining, generating, assigning and allotting means, said links connecting said devices and processor in their respective domains to the link control means thereof, and means connecting said processor to the second plurality of highways in the domain for loading programs and data.

22. The system according to claim 20 further comprising link control devices in each of said domains, said link control devices having means providing said time slot defining, generating, assigning and allotting means; at least one of said domains having a stack of modular switching units and gateway means connecting said modular switching units, said plurality of intradomain highways in said one of said domains and one of said communication links of said one domain.

* * * * *